(12) United States Patent
Johnson et al.

(10) Patent No.: US 7,734,522 B2
(45) Date of Patent: Jun. 8, 2010

(54) ASP BUSINESS DECISION ENGINE

(75) Inventors: Gregory A. Johnson, Bloomington, MN (US); Susan A. Sperl, Stillwater, MN (US); Jeff Klepfer, St. Louis Park, MN (US); Raffi M. Kassarjian, San Francisco, CA (US); Gregory S. Capella, Petaluma, CA (US); Rachel C. Asch, Petaluma, CA (US); Peter R. Jones, Petaluma, CA (US); Leonard E. Look, El Cerrito, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

(21) Appl. No.: 11/971,858

(22) Filed: Jan. 9, 2008

(65) Prior Publication Data
US 2008/0114674 A1    May 15, 2008

Related U.S. Application Data

(63) Continuation of application No. 09/790,382, filed on Feb. 21, 2001, now Pat. No. 7,356,503.

(51) Int. Cl.
G06Q 40/00    (2006.01)

(52) U.S. Cl. .................. 705/35; 726/22; 707/2; 709/220; 713/193

(58) Field of Classification Search .............. 705/35, 705/38; 726/22; 713/193; 709/220; 707/2
See application file for complete search history.

(56) References Cited

U.S. PATENT DOCUMENTS

| | | | |
|---|---|---|---|
| 5,239,462 A | 8/1993 | Jones et al. | |
| 5,262,941 A | 11/1993 | Saladin et al. | |
| 5,274,547 A | 12/1993 | Zoffel et al. | |
| 5,611,052 A | 3/1997 | Dykstra et al. | |
| 5,696,907 A | 12/1997 | Tom | |
| 5,699,527 A | 12/1997 | Davidson | |
| 5,765,144 A | 6/1998 | Larche et al. | |
| 5,774,882 A | 6/1998 | Keen et al. | |
| 5,797,133 A | 8/1998 | Jones et al. | |
| 5,870,721 A | 2/1999 | Norris | |
| 5,878,403 A | 3/1999 | DeFrancesco et al. | |

(Continued)

FOREIGN PATENT DOCUMENTS

WO    WO 00/26831    5/2000

(Continued)

OTHER PUBLICATIONS

Friendland, Marc;1996 "Credit Scoring Digs Deeper into Data", Credit World v84n5 pp.19-33 May/Jun. 1996.

(Continued)

*Primary Examiner*—Harish T. Dass
(74) *Attorney, Agent, or Firm*—Mintz, Levin, Cohn, Ferris, Glovsky and Popeo, P.C.

(57) ABSTRACT

A decision engine is provided that integrates all components of a credit application process, including access to and manipulation of credit bureau data, credit scoring, credit decisioning, and matching the correct products, into a single application service provider (ASP) platform which is accessible through a series of Application Programming Interfaces (APIs).

22 Claims, 16 Drawing Sheets

U.S. PATENT DOCUMENTS

| | | | |
|---|---|---|---|
| 5,930,776 A | 7/1999 | Dykstra et al. | |
| 5,940,811 A | 8/1999 | Norris | |
| 5,940,812 A | 8/1999 | Tengel et al. | |
| 5,950,179 A | 9/1999 | Buchanan et al. | |
| 6,014,645 A | 1/2000 | Cunningham | |
| 6,029,149 A | 2/2000 | Dykstra et al. | |
| 6,088,686 A | 7/2000 | Walker et al. | |
| 6,092,121 A | 7/2000 | Bennett et al. | |
| 6,105,007 A | 8/2000 | Norris | |
| 6,112,190 A | 8/2000 | Fletcher et al. | |
| 6,119,103 A | 9/2000 | Basch et al. | |
| 6,223,341 B1* | 4/2001 | Bittner et al. | 717/154 |
| 6,324,524 B1 | 11/2001 | Lent et al. | |
| 6,405,181 B2* | 6/2002 | Lent et al. | 705/38 |
| 6,611,816 B2* | 8/2003 | Lebda et al. | 705/38 |
| 6,988,082 B1* | 1/2006 | Williams et al. | 705/36 T |
| 7,089,588 B2* | 8/2006 | Schaefer et al. | 726/22 |
| 2002/0040339 A1 | 4/2002 | Dhar et al. | |
| 2006/0178918 A1 | 8/2006 | Mikurak | |

FOREIGN PATENT DOCUMENTS

| | | |
|---|---|---|
| WO | WO 00/26833 | 5/2000 |

OTHER PUBLICATIONS

Don Box; "XML.com: Inside SOAP"; Feb. 9, 2000; WorldWideWeb. xml.com/pub/a/2000/02/09 feature/.

Pannkuk, Lois, Bauman, Dodle; "Avoiding the Perils of Noncompliance"; ABA Bank Compliance v22n5 ; pp, 40-52; May/Jun. 2001; ISSN: 0887-0187; Jrnl Code: BCP.

* cited by examiner

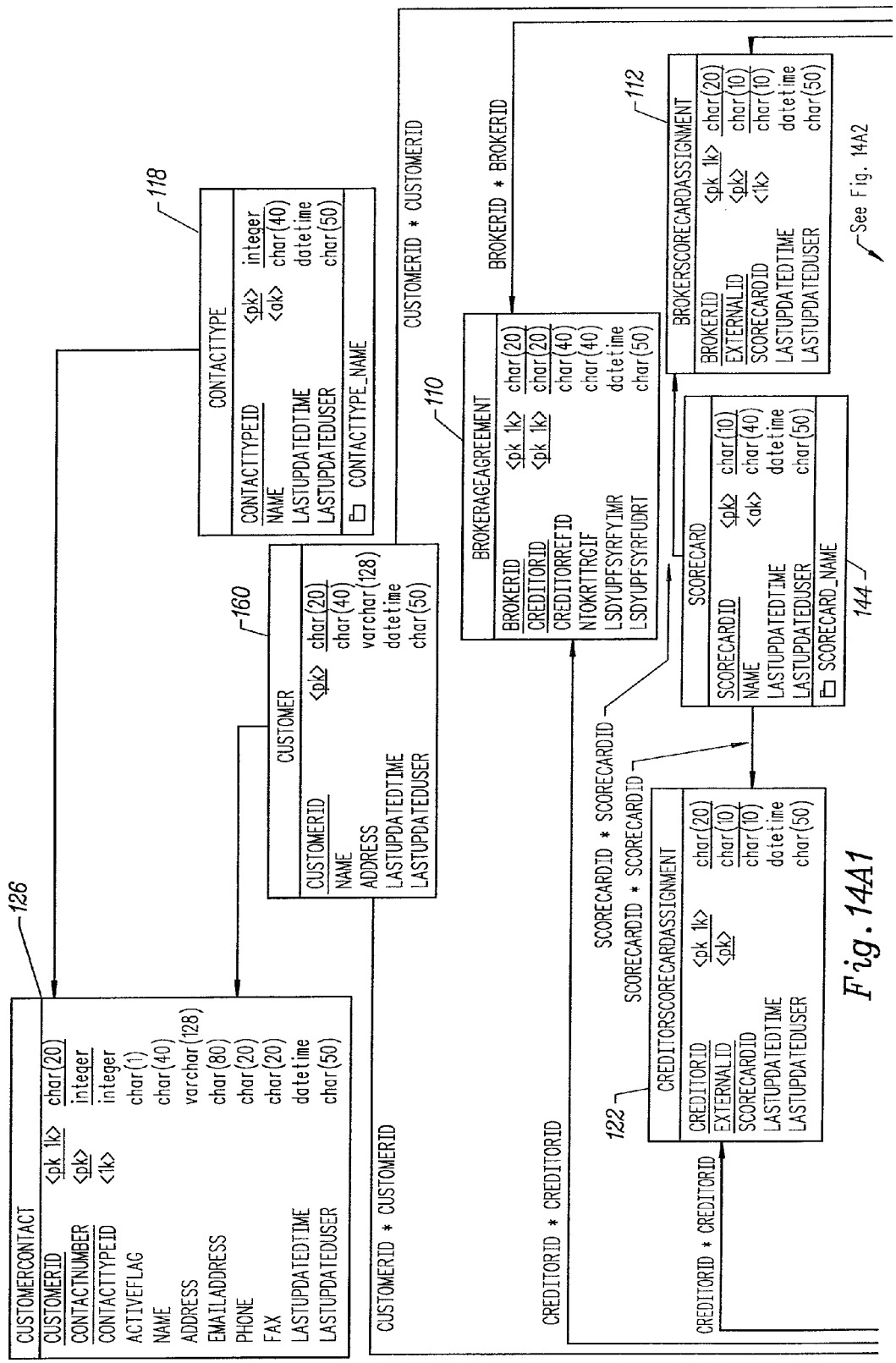
Fig. 14A1

Fig. 14A2

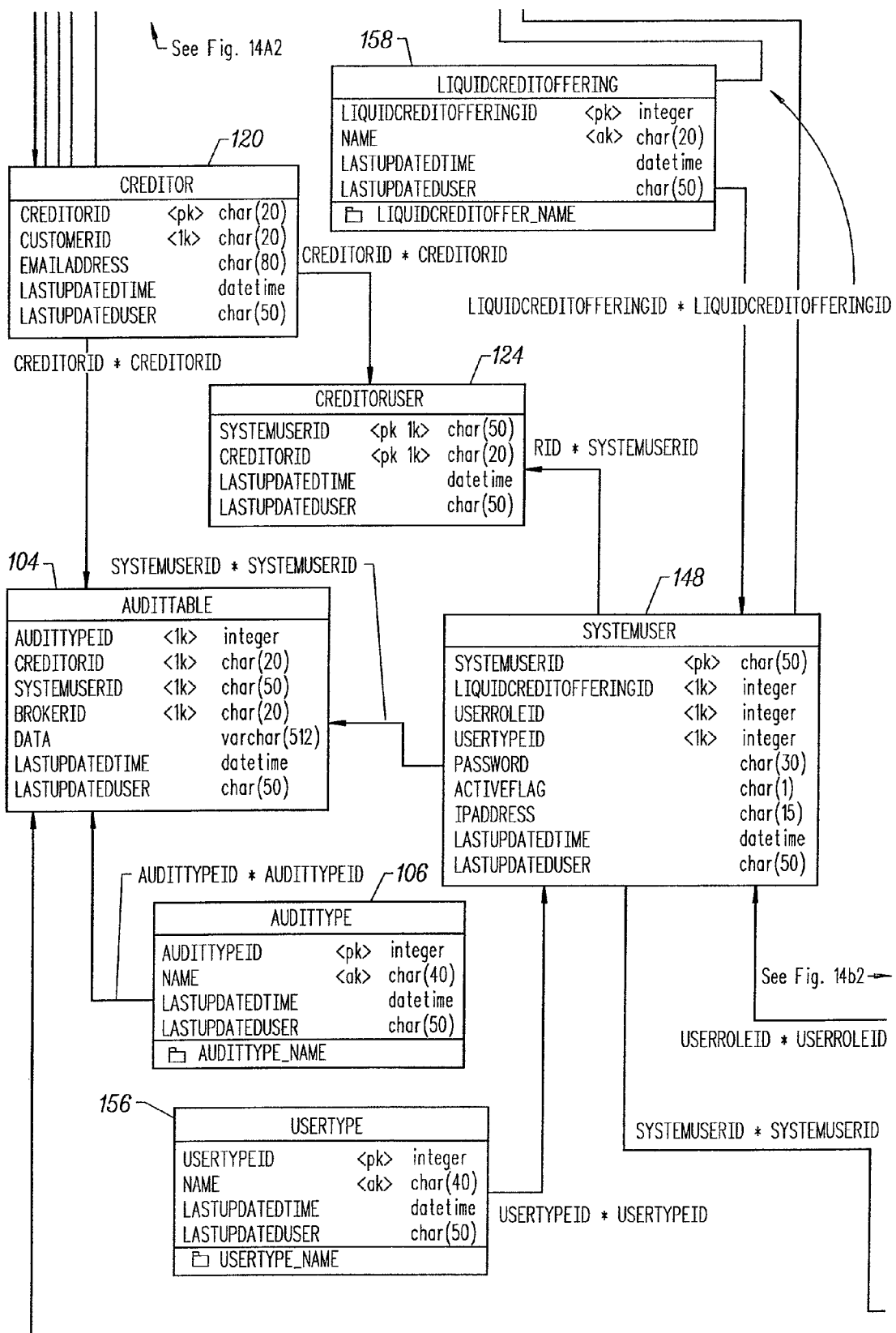
Fig. 14B1

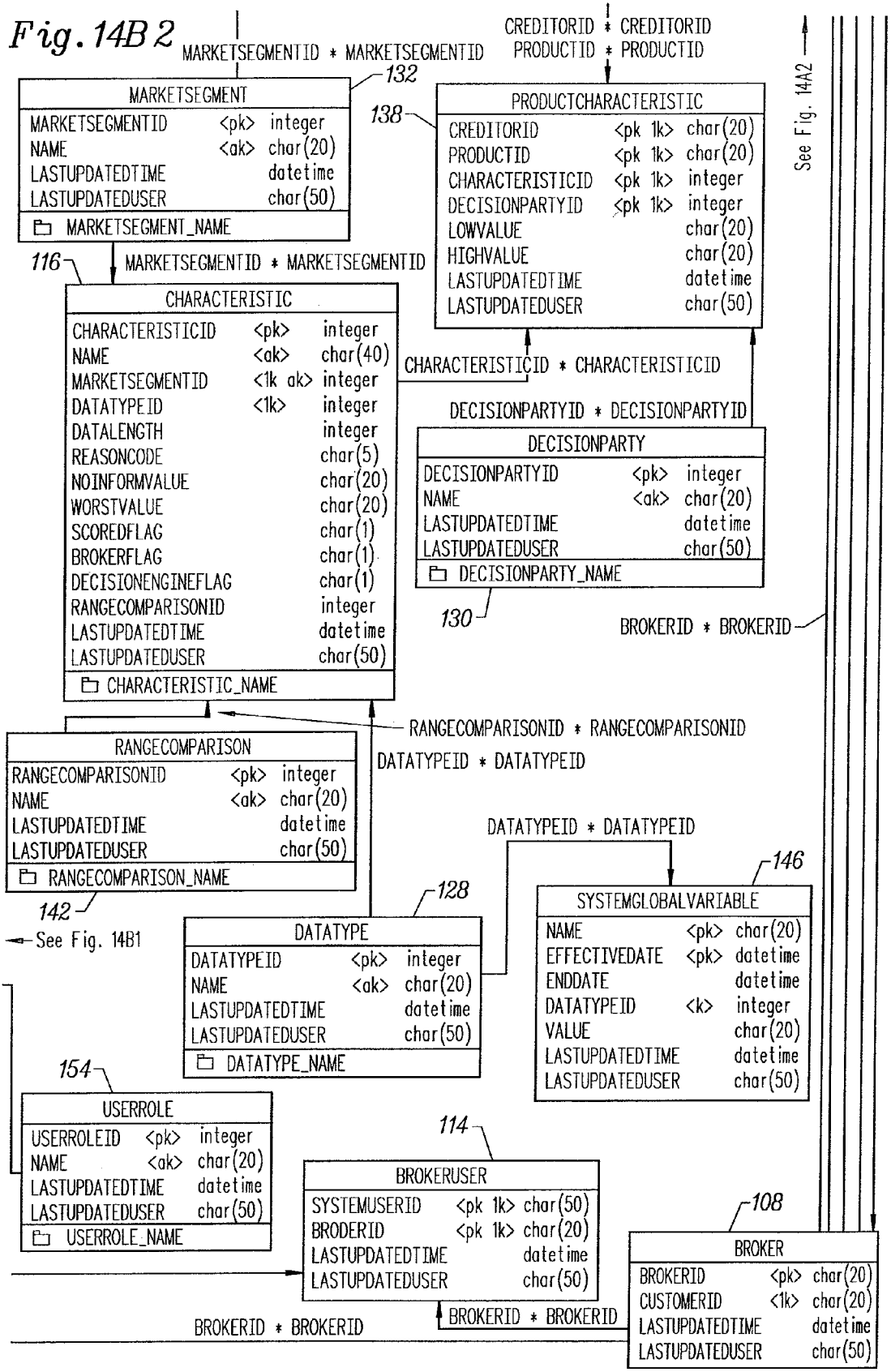
Fig. 14B2

ASP BUSINESS DECISION ENGINE

CROSS-REFERENCE TO RELATED APPLICATIONS

This application is a continuation of U.S. patent application Ser. No. 09/790,382, filed Feb. 21, 2001 now U.S. Pat. No. 7,356,503.

BACKGROUND OF THE INVENTION

1. Technical Field

The invention relates to the submission of applications for credit. More particularly, the invention relates to a decision engine that facilitates the submission, receipt, and evaluation of an application for credit.

2. Description of the Prior Art

For those entities who apply for, offer, or broker credit in its various forms there are solutions available that allow one to obtain credit bureau data, parse it, and provide the data, e.g. an easy to read version of the data, create additional values from the original data, and return the reasons for the data. Company of San Rafael, Calif. offers a SEARCH product, which is an example of these solutions. There have been many components of the solution available as end-user solutions. There have also been some components available as on-line, e.g. Internet or direct dial up connection, solutions.

There are also scoring engine technologies that Fair, Isaac (hereinafter, interchangeably used with the term "Company"), HNC Software, Inc., American Management Systems, Incorporated (AMS), Experian Information Solutions, Inc., and many other companies produce. These tools allow end-users to implement a scoring model in a software tool and return the score, the reasons for the score, and all the ancillary data back to the calling system. Company solutions include TRIAD™, ASAP™, StrategyWare®-ASAP™, CreditCenter™, Prosper, Prosper-ASAP, ScoreWare®, decision system, StrategyWare®, CreditDesk®, and SBSS$^{SM}$-CreditDesk®.

Other systems can create additional complex characteristics, which are values derived from other data, such as determining the "open amount to buy on credit card balances", calculated from the various lines of credit, their associated balances and their limits. Such systems can implement segmentation strategies, e.g. defining who in Northern California might want a car loan, execute rules, for example "Do not lend to people under the age of 18," and implement multiple score models in series. These rules, strategies, models, and characteristics are established by the clients who use or implement the system, or their representatives. Company products in this space include a decision system and StrategyWare.

It would be advantageous to provide a solution that integrates all of the components of a credit application process, including access to and manipulation of credit bureau data, credit scoring, and credit decisioning into a single application service provider (ASP) platform.

SUMMARY OF THE INVENTION

The invention provides a solution that integrates all of the components of a credit application process, including access to and manipulation of credit bureau data, credit scoring, and credit decisioning into a single application service provider (ASP) platform.

The presently preferred embodiment of the invention comprises a solution that combines analytic and decisioning technology with Web-based credit granting in an ASP model. The invention applies available credit origination solutions and brings such solutions to the Internet.

The decision ASP environment disclosed herein allows clients to reduce the time and costs associated with installation, upgrades, and maintenance of software and analytic common to the traditional mainframe environment. For users of mainframe solutions, this reduces or eliminates the problems with the inflexibility of the mainframe, maintenance issues, and continual update/scalability/migration issues.

The invention allows credit brokers to benefit from access to a wider audience for their services. In addition to attracting more consumers, brokers are able to offer multiple choices based on the consumer's individual needs and situation, resulting in enhanced customer satisfaction. This aspect of the invention is implemented in a broker engine that matches scored applicants to credit grantors' lending criteria, and that presents applicants with a variety of credit options within seconds. Applicants receive a list of multiple offers and multiple terms, while participating lenders receive quality borrowers.

The invention reduces total cost of ownership for decisioning applications. Without large up-front costs and with reduced need for maintenance, the total cost of ownership is greatly reduced, leading to an enhanced return on investment and profitability. In addition the service can be made available within an institution and its associated components worldwide, in days rather than months to years.

Consumers and small businesses benefit from the convenience of getting credit when and where they want it. The broker engine provides consumers with the ability to get credit at point of Internet purchases, allowing them to make instant purchases, i.e. they do not have to wait minutes/hours/days for credit approval. The broker engine also provides consumers with access to multiple lending sources offering more credit "at an fingertips when one should want it."

Financial institutions get best-in-class decision technology, available through their browser. For those who are already racing to the Web environment, the decision engine disclosed herein gets them there quicker.

Consumers are demanding access to financial information and products via the Web. The decision engine enables financial institutions to offer not just electronic brochures on their Web site, but it enables them to accept and decision credit applications immediately and in an automated environment. This increases a financial institution's ability to meet consumer demands for immediate credit and improve customer service with faster responses and more ways to say "yes" to requests.

In cases where credit will not be offered to an applicant, the reasons for not providing credit are automatically generated off of the objective algorithms built into the invention, meeting the legal requirements for adverse action. Using the invention, lenders automatically have the data returned necessary to be legally compliant in taking adverse action through reason codes provided within the invention.

The invention is uniquely suited to help acquire new consumer and small business customers via the Internet.

The invention offers at least the following advantages over known credit decisioning solutions:

The invention gives credit decisions powered by, in the presently preferred embodiment, Company's gold standard analytic and decision technology.

The invention can be up and running in days, reducing the wait until initial implementation and subsequent upgrades. As the objective scorecards are based on historical data, reducing the time to implement the scorecards significantly improves the quality of using the scorecards. Present solutions can take months to years to implement while this invention has had implementations in days to weeks and upgrades can be instantaneous with the changing of the scorecard.

The invention can respond in seconds to each interaction. This will significantly reduce the number of abandoned online shopping carts by offering instant purchasing power at the point of customer contact. Each second has a measurable impact upon the willingness of the consumer to continue to wait.

The invention does not require significant investment in time and cost for on-site software installations, implementation, upgrades, and maintenance.

With the invention's decision support in the background, a client's site can maintain their own unique look and feel. The application can provide decisioning through a defined application programming interface (API) that allows an existing system or developed system to use the decisioning without having to change the look and feel.

The decision engine provides access to multiple lender's products simultaneously so that each application can be evaluated against a pool of competing lenders for providing instant credit and establishing lasting customer relationships.

The decision engine empowers traditional credit grantors to develop instant credit relationships via their Web sites. Product matching technology supports decision strategies, optimizing electronic solicitation campaigns, and encouraging visiting customers and prospects to apply for credit with the promise of an instantaneous reply.

The decision engine allows e-tailers and virtual marketplaces quickly and significantly to increase sales revenue, turning browsers into buyers. By offering immediate purchasing power, businesses establish relationships that grow beyond single transactions, up-selling or cross-selling goods to shoppers with instant credit.

Getting started is significantly faster and more cost-effective. Thus, it is easy to begin building customer relationships with the decision engine. The client takes the consumer or small business customer's application for credit and sends that information to the invention to an API using Extensible Markup Language (XML). In seconds, the invention returns all matching credit products for presentation to the customer via a synchrous response in the API via XML.

The invention provides the ability to establish, manage, and update credit product matching criteria at any time. The end-user (client) or multiple clients (for broker engine) each can have multiple unique decisioning rules and factors assessed simultaneously, in seconds.

The invention is optimized to allow direct feeds of the decisioning strategies into the invention through an API. This allows the clients current data bases, legacy systems, account management systems, or other technologies as well as partner technologies to feed very complex decisioning strategies and products automatically into the invention. This allows the system to seamlessly work with other technologies, reduces re-keying, reduces errors, and allows for simultaneous use of the same strategies in the client's systems and the invention.

The invention incorporates product match technology to fully compare all credit products in the invention with the characteristics of the application. It then will either return either many offers of credit, one offer of credit, and/or conditional offers of credit or it will return the reasons that the application did not have any matches.

The invention is fast to market because it offers the choice of existing, pre-developed application risk models, developed using national pools of data from the combined experience of consumer and small business credit grantors, and industry-standard FICO® credit bureau scores. Or it can implement custom models.

BRIEF DESCRIPTION OF THE DRAWINGS

FIGS. 14a-14b show a physical data model for a decision system according to the invention.

DETAILED DESCRIPTION OF THE INVENTION

Figure 1:
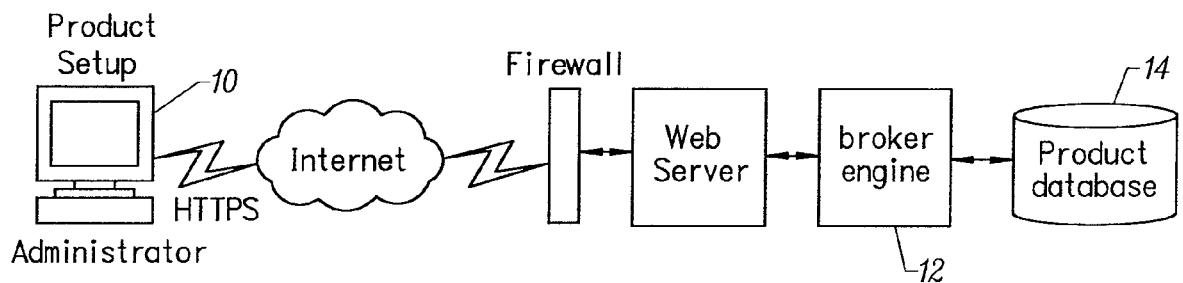
FIG. 1 is a block schematic diagram of a according to the invention.

The invention provides a solution that integrates all components of a credit application process, including access to and manipulation of credit bureau data, credit scoring, and credit decisioning into a single application service provider (ASP) platform.

The presently preferred embodiment of the invention comprises a solution that combines analytic and decisioning technology with Web-based credit granting in an ASP model. The invention applies available credit origination solutions and brings such solutions to the Internet. The invention is comprised of various modules that include the following three modules, i.e. the app engine, the broker engine, and the decision engine.

App Engine

In the app engine, one of the three main services that comprise the presently preferred embodiment of the invention, a client facilitates the decisioning of applications for a financial institution. For example, a bank employee uses this service in place of an end user application processing system.

A graphical user interface (GUI) allows the collection of needed data to submit a request for a loan, credit card, lease, or line of credit. On submission of an application by the customer, certain application data are sent to a decision engine.

The decision engine, in turn, pulls a credit reporting agency report(s), and scores the application. The application data, e.g. credit reporting agency data and score for each applicant, reason codes, and all generated data used in the decision, are then sent back to the GUI to be presented for further processing. If appropriate, the loan is automatically recommended for approval, review, or disapproval. If approved the application, decisioning, and credit bureau data are provided to a secure server for the institution to obtain and use. If review is needed, the application is routed to the appropriate group for further work and manual decisioning. If disapproved, the reasons for the disapproval and all of the application, decisioning, and credit bureau data are provided to a secure server for the institution to obtain and use. Reports are provided on-line on the system performance, decisioning results, and through put are available on-line. A data base of all the application, decisioning, and credit bureau data is maintained for an appropriate interval which, in the presently preferred embodiment of the invention, is up to 26 months meeting Federal lending requirements for retaining data after denying credit. The app engine supports both consumer and small business credit decisioning Broker Engine In the broker engine, a financial services broker facilitates the decisioning of applications for many financial institutions. The broker has an existing application processing system that supports external decisioning. On submission of an application by the customer, certain application data are sent to the broker engine through an XML API. The broker engine supports both consumer and small business credit decisioning The broker engine, in turn, pulls a credit reporting agency report(s), scores the application, and performs a product match. The product match identifies all of the products for which the applicant(s) or small business is qualified, for each financial institution working with the broker. The application data, e.g. credit reporting agency data, score, reason codes, product matches, are then sent back to the broker for further processing.

Decision Engine

In the decision engine, one institution's applications are received through the XML API and are processed. The institution has an existing application processing system that supports external decisioning. On submission of an application by the customer, certain application data are sent to the decision engine via the API.

The decision engine, in turn, pulls a credit reporting agency report(s), scores the application, and performs a product match. The product match identifies all of the products for which the applicant is qualified, for each financial institution working with the broker. The application data, e.g. credit reporting agency data, score, reason codes, product matches, are then sent back to the broker for further processing. The decision engine supports both consumer and small business credit decisioning Application Programming Interface (API)

The API consists of a number of function calls which provide the ability to interact with the three engines. The APIs are accessed using the Simple Object Access Protocol (SOAP) and the data are submitted using XML. All calls to the API are synchronous.

How do the Engines Work

The decision or broker engine receives a call from an application processing system, process, or web site to make a decision on an application. Using the data in the application and the pre-programmed bureau preferences of the clients, the engine obtains a credit bureau report on the applicant and the co-applicant (if co-applicant information is submitted). In small business decisioning, two principles and the small business credit reports may be obtained.

The engine then automatically routes the application and credit bureau data to the decisioning engine to obtain a combined score, i.e. application and credit bureau scores. The broker engine then uses this score and other factors established by the financial services institutions (clients), to determine the product(s) for which the application qualifies.

The matching technology in the preferred embodiment of the invention emulates the technology used by a bone marrow matching system that is in the public domain (National Marrow Donor Program matching HLA types for the Bone Marrow Donors). The interface to provide and retrieve data to the system is based on the XML and the simple object access protocol (SOAP). The fields for this input and out are unique to the invention.

The broker engine then returns these product(s) matches to the calling system with all decisioning data and reason codes. The matches can be from similar products (all loans), dissimilar products, (credit card, loan, and lease), or no products might be recommended. Reason codes are returned in the data if no products can be recommended.

After the products are returned, the calling system allows the applicant to choose the best product for them. The calling system then creates a second call to the broker engine to tell it what product was selected. The broker engine, in turn, sends this selection to the appropriate financial services institution with complete decisioning information and reruns the same to the calling system.

All the set up of the product data and their conditions required for these products are entered into the broker engine through a set of administrative screens. The financial services institution, or its designated representative, can change the products offered and then offer new, or changed conditions daily, if desired.

Capacity

The preferred engines are capable of processing thousands of applications per minute with pre-built system extensibility to accommodate significant increases in volume.

Configuration

One or more loan, lease, or revolving products must be configured before clients can process applications. Product configuration allows the lenders to specify product offerings that are very similar or even very different, depending on how they are configured. Products can be set up to target similar or different market segments. They can be categorized as either revolving or direct credit. Additionally, for each product offering, lenders can specify useful identification numbers, descriptive information, and other offer terms.

Access to the product configuration is provided through a set of Hypertext Markup Language (HTML) forms (see the FIG. 1). A lender administrator 10 enters the necessary information into the forms, and then submits the information to the broker engine 12 across an HTTPS connection.

The broker engine validates the submitted information, and then stores it on a product database 14. Each night the new product information is placed into production.

The product configuration information includes both information about the product offering and the match criteria for that product.

Processing Applications

Figure 2:
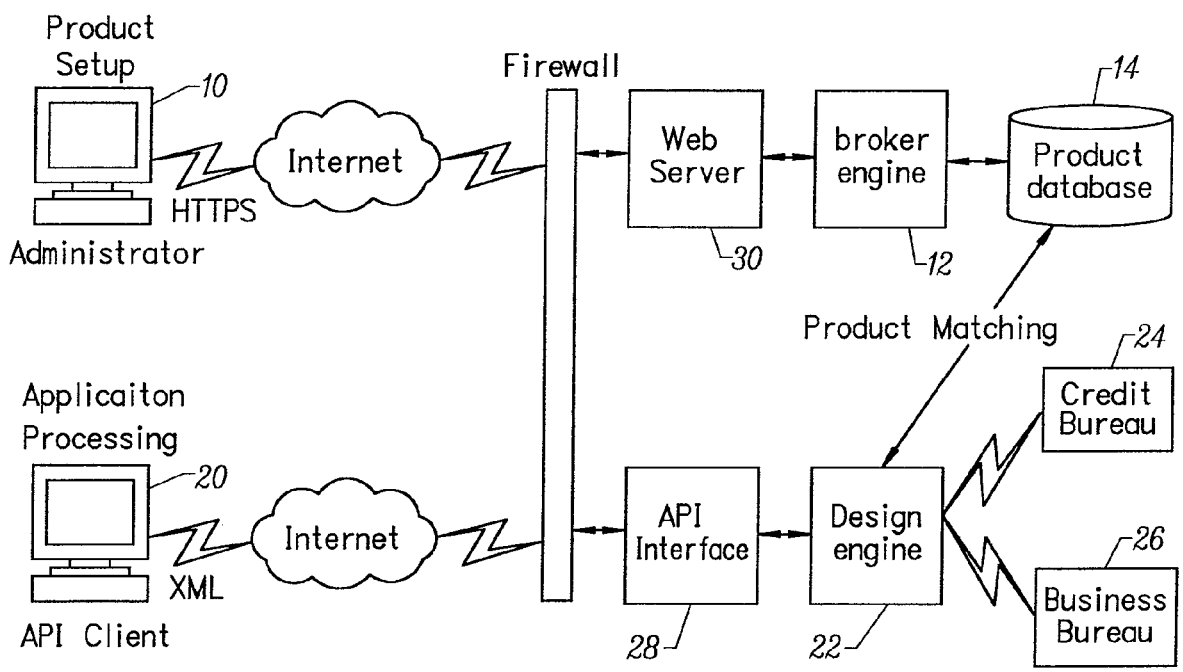
FIG. 2 is a block schematic diagram of a according to the invention.

FIG. 2 shows that application processing begins when the API 20 submits application data to the broker engine 22. Using key fields in the application data, the broker engine then pulls credit reports and calculates a total score based on characteristics from both the application and credit bureau data. Then, using the application, credit bureau, scores, and generated data the broker engine searches the product database 14 for potential matches. Finally, it sends any matches it finds back to the API 28.

The system sends the product selection, all decisioning data (including application and bureau data), and reason codes out to a secure site 30 for the lender who created the product. The lender is then notified that a decisioned application is waiting for then to download. For broker engine, after the product is accepted by the applicant, the system submits a second call to the API to notify the lender and obtain the product data.

Credit Bureau Interface

With the invention, the client accesses the service via the Internet. The system looks to the bureau 24 like a client themselves or a "third party processor" to connect to the bureaus' product system. The client still works with their existing bureau representative to establish their services and set up their account. They continue to use their existing subscriber contact name, but must get a new subscriber number for an access name. They then have the same type of contractual and pricing relationship with the bureau. The only difference is that the client does not need to obtain a phone number or leased line from the bureau because the invention is connecting to the bureau.

Data Exchange

Data exchange between the client and the system takes place using three technologies simultaneously:
  Communication link via HTTPS;
  SOAP envelopes; and
  XML input and output documents.

HTTPS

For security reasons, the invention uses Hypertext Transfer Protocol Secure (HTTPS), routed through selected system ports, as the communication protocol for remote API calls over the Internet.

SOAP Envelopes

Method or function calls are accomplished using SOAP envelopes. The invention uses the SOAP 1.0 working draft specification, which can be found on the Web. For additional information on SOAP, refer to book Professional XML.

Table 1 depicts the coding for the HTTP POST header and the SOAP envelope and method call from the client system to the system, where FunctionName represents the name of the remote API function and where enginename represents the engine being accessed.

TABLE 1

SOAP Envelope and Method Call for XML Input to System

| HTTP POST Header | POST / enginename/LiquidCredit.asp HTTP / 1.1<br>Host:liquidcredit<br>Content-Type: text / xml<br>Content-Length: nnn<br>SOAPMethodName: SOAP#FunctionName |
|---|---|

TABLE 1-continued

SOAP Envelope and Method Call for XML Input to System

| SOAP Envelope | <SOAP:Envelope xmlns:SOAP=*urn:schemas-xmlsoap-org:soap.v1*><br>  <SOAP:Body><br>    <m:FunctionName xmlns:m=*SOAP*><br>      <String><br>        <!--Insert XML input to LiquidCredit here--><br>      </String><br>    </m:FunctionName><br>  </SOAP:Body><br></SOAP: Envelope> |
|---|---|

Table 2 depicts the HTTP POST header and the SOAP envelope coding returned from the system, where FunctionName includes the name of the function called.

TABLE 2

SOAP Envelope for XML Output from System

| HTTP POST Header | HTTP/ 1.1 200 OK<br>Connection:close<br>Content-Type:text/xml<br>Content-Length:nnnn |
|---|---|
| SOAP Envelope | <SOAP:Envelope xmlns:SOAP=*urn:schemas-xmlsoap-org:soap.v1*><br>  <SOAP:Body><br>    <m:FunctionNameResponse xmlns:m=*SOAP*><br>      <String><br>        <!--XML output from LiquidCredit appears here--><br>      </String><br>    </m:FunctionNameResponse><br>  </SOAP:Body><br></SOAP: Envelope> |

XML Input and Output

Electronic data exchange between the client system and system of the invention is facilitated by XML input and output payloads incorporating consumer and/or business data. The preferred embodiment of the invention uses the XML 1.0 specifications, which can be found on the Web.

Figure 3:
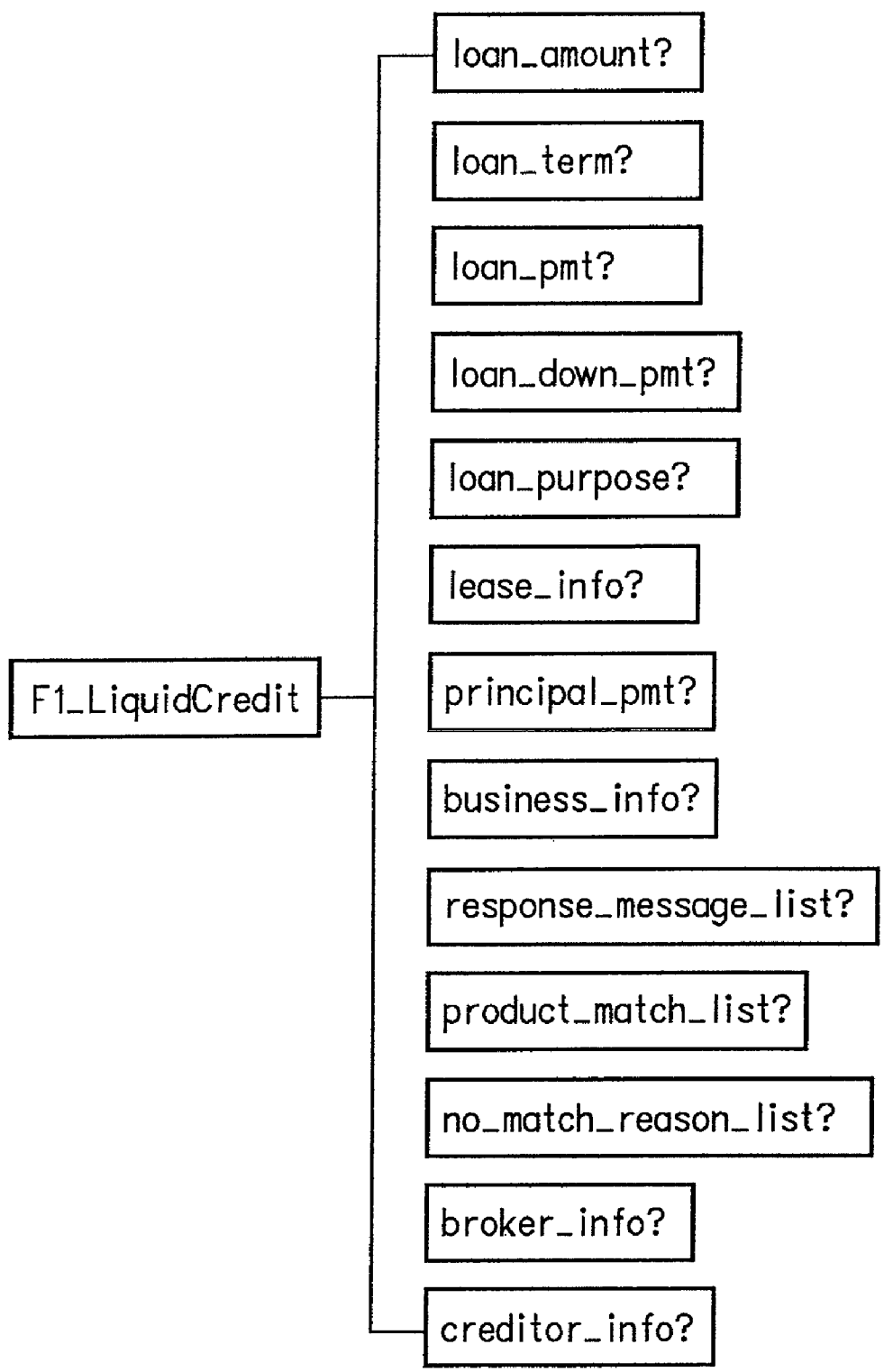
FIG. 3 is a diagram of a root level XML schema according to the invention.

FIG. 3 provides an XML schema that contains the data model for validating input and output data. As part of the API calls, the schema programmatically validates that the input XML payload is constructed correctly (see, also, the physical model, discussed below).

Scoring Engine

Figure 4:
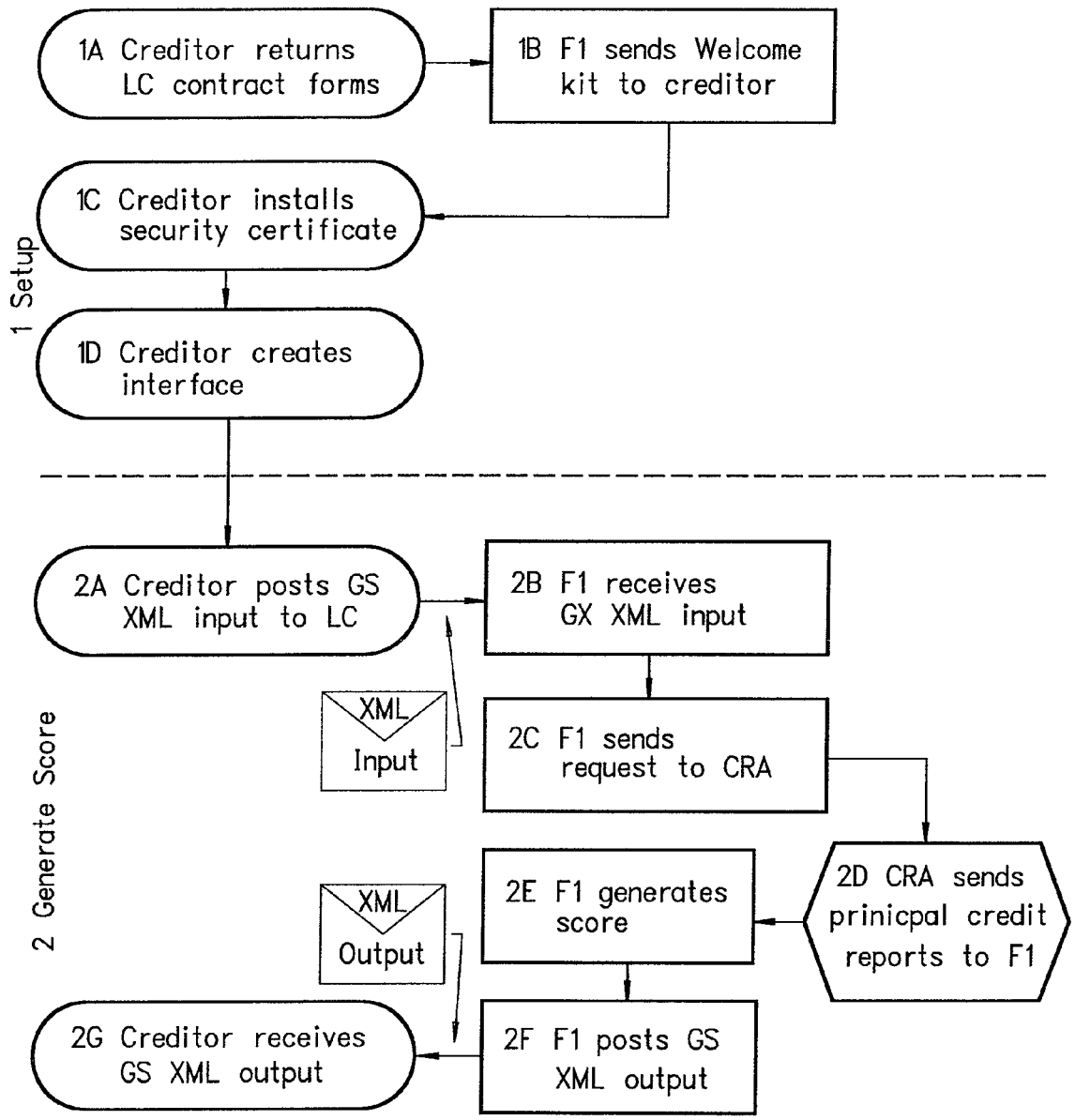
FIG. 4 is a flow diagram showing consumer application setup and a successful transaction in the scoring engine according to the invention.

The scoring engine pulls credit reporting agency (CRA) and business bureau reports for submitted applications, and produces a score. FIG. 4 (see, also, Table 3) shows the data flow that occurs between an institution, the invention, and the credit reporting agencies during scoring engine setup and a successful transaction for a consumer application.

TABLE 3

Acronyms used in Consumer Application Diagrams and Text

| Acronym | Meaning |
|---|---|
| CBD | Credit Bureau Data |
| CRA | Credit Reporting Agency (Credit Bureau) |
| FI | Fair, Isaac |
| GS | GenerateScore |
| HTTPS | HyperText Transfer Protocol (Secure) |
| IDS | Internet Delivery Services Web site |
| LC | LiquidCredit |
| SOAP | Simple Object Access Protocol |

Data Flow Steps in Consumer Setup/Transaction

1. Setup

1A. Creditor returns system contract forms.
New system client (creditor) returns signed contract and project initiation forms.

1B. Company sends Welcome kit to creditor.
Company sends group-level and user-level login IDs and passwords to creditor.
Company sends instructions for installing security certificates to creditor.
Company sends creditor list of valid scorecard IDs.

1C. Creditor installs security certificate.
Creditor goes to the Company Digital ID Center Web site and enrolls for a security certificate.
Creditor receives PIN, goes to the VeriSign Web site, and installs the Digital ID.
Creditor goes to the Digital ID Center Web site and installs the security certificate.

1D. Creditor creates interface.
Creditor creates interface to system scoring engine according to API Guide.
Creditor works with Company to ensure that the interface works correctly.

2. GenerateScore

2A. Creditor posts GenerateScore XML input to system.
Creditor creates GenerateScore XML input.
Creditor wraps XML input in SOAP envelope and posts it via HTTPS.
enginename=scoringengine
FunctionName=GenerateScore
Test URL=
Production URL=

2B. Company receives GenerateScore XML input.
FI receives XML input.
FI authenticates user and checks IP address.
FI generates an application submission ID.
FI validates XML input.

2C. Company sends request to credit reporting agency.

2D. Credit reporting agency sends principal credit report(s) to Company.

2E. Company generates score.

2F. Company posts GenerateScore XML output to system.
FI creates GenerateScore XML output. Output contains:
Scores
Credit reporting agency report(s)
Adverse action codes
Generated values
Selected input data
FI wraps XML output in SOAP and posts it via HTTPS.
FunctionNameResponse=GenerateScoreResponse.

2G. Creditor receives GenerateScore XML output.
Creditor receives GenerateScore XML output.
Creditor unwraps XML output from SOAP.

Business Applications

Figure 5:
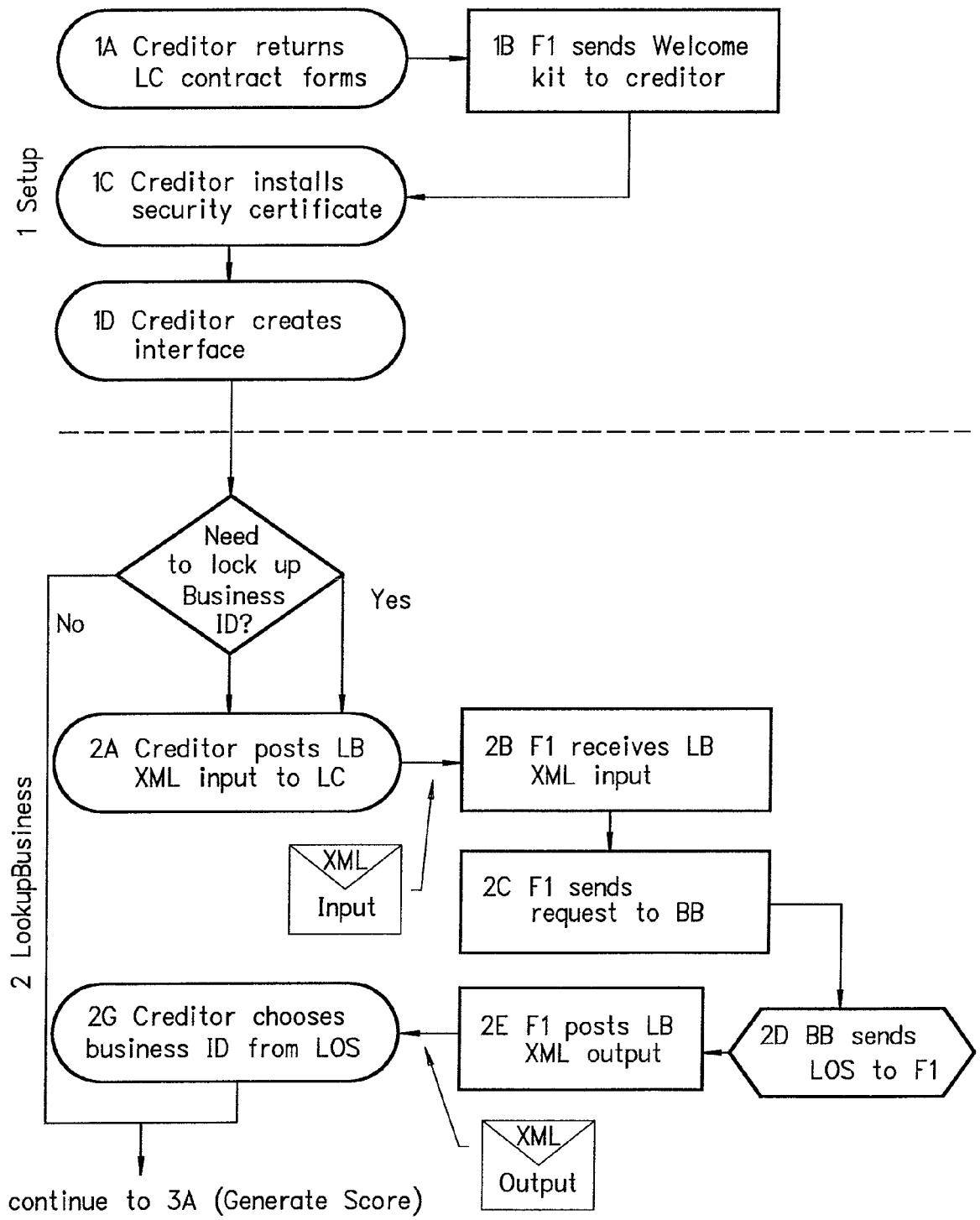
FIG. 5 is a flow diagram showing a first part of business application setup and a successful transaction in the scoring engine according to the invention.
Figure 6:
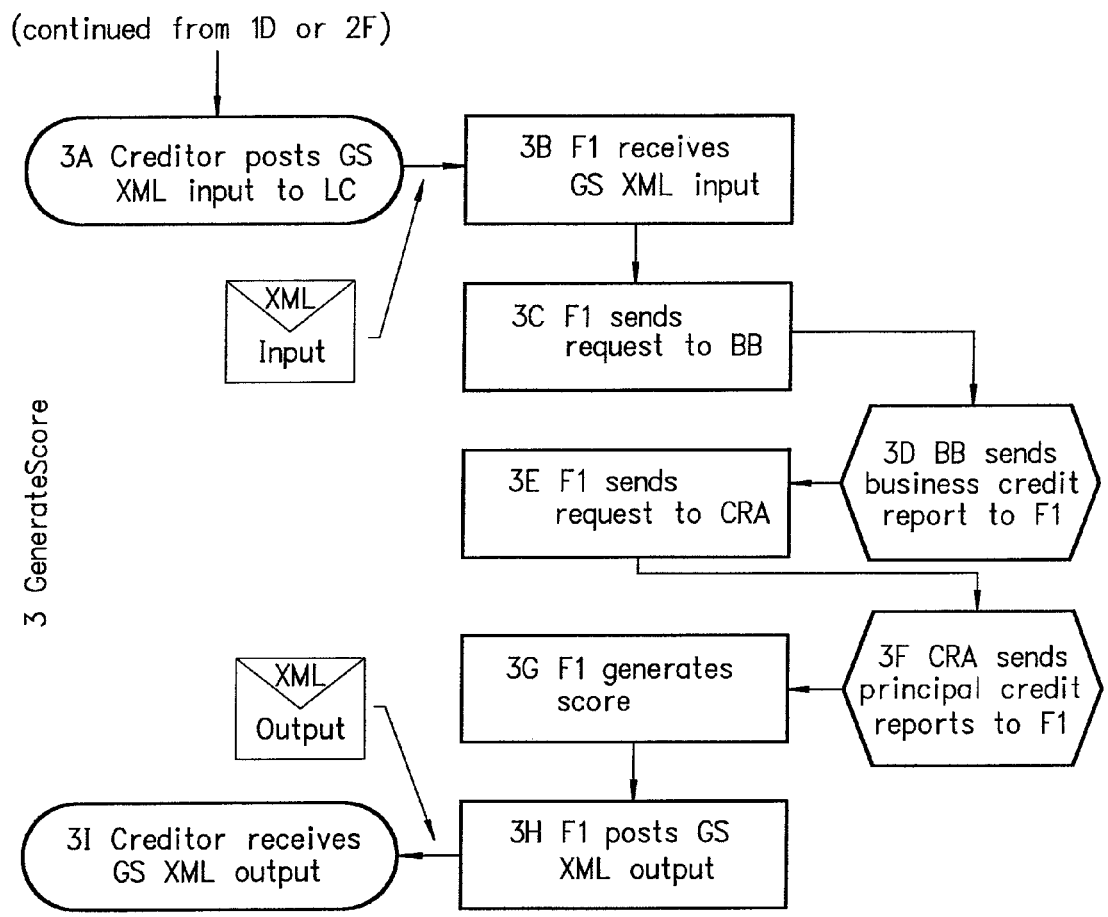
FIG. 6 is a flow diagram showing a second part of a business application setup and a successful transaction in the scoring engine according to the invention.

FIGS. 5 and 6 (see, also, Table 4) show the data flow that occurs between an institution, Company, the credit reporting agencies, and the business bureaus during scoringengine setup and a successful transaction for a business application.

TABLE 4

Acronyms used in Business Application Diagrams and Text

| Acronym | Meaning |
| --- | --- |
| BB | Business Bureau |
| CBD | Credit Bureau Data |
| CRA | Credit Reporting Agency (Credit Bureau) |
| FI | Fair, Isaac |
| GS | GenerateScore |
| HTTPS | HyperText Transfer Protocol (Secure) |
| IDS | Internet Delivery Services Web site |
| LB | LookupBusiness |
| LC | LiquidCredit |
| LOS | List of Similars |
| SOAP | Simple Object Access Protocol |

Data Flow Steps in Business Setup/Transaction

1. Setup

1A. Creditor returns system contract forms.
New system client (creditor) returns signed contract and project initiation forms.

1B. Company sends Welcome kit to creditor.
Company sends group-level and user-level login IDs and passwords to creditor.
Company sends instructions for installing security certificates to creditor.
Company sends creditor list of valid scorecard IDs.

1C. Creditor installs security certificate.
Creditor goes to the Company Digital ID Center Web site and enrolls for a security certificate.
Creditor receives PIN, goes to the VeriSign Web site, and installs the Digital ID.
Creditor goes to the Digital ID Center Web site and installs the security certificate.

1D. Creditor creates interface.
Creditor creates interface to system scoring engine according to API Guide.
Creditor works with Company to ensure that the interface works correctly.

Note: If the creditor does not need to look up the business' DUNS number or Experian file number, creditor skips to step 3 and calls the GenerateScore function. Otherwise, creditor performs step 2 (calls the LookupBusiness function) to obtain a list of similar businesses from which the business ID number can be obtained.

2. LookupBusiness

2A. Creditor posts LookupBusiness XML input to system.
Creditor creates LookupBusiness XML input to system from application data source; rpt_selection_id field must be blank or missing from input.
Creditor wraps XML input in SOAP envelope and posts it via HTTPS.
enginename=scoringengine
FunctionName=LookupBusiness
Test URL=
Production URL=

2B. Company receives LookupBusiness XML input.
FI receives XML input.
FI authenticates user and checks IP address.
FI generates an application submission ID.
FI validates XML input.

2C. Company sends request to business bureau.
  Company sends application information to business bureau (Experian or Dun & Bradstreet).

2D. Business bureau sends LOS (List of Similars) to Company.

2E. Company posts LookupBusiness XML output to system.
  FI creates LookupBusiness XML output.
  FI wraps XML output in SOAP and posts it via HTTPS. FunctionNameResponse=LookupBusinessResponse 2F. Creditor chooses business ID from LOS.
  Creditor receives LookupBusiness XML output.
  Creditor unwraps XML output from SOAP.
  Creditor formats CBD report.
  Creditor chooses appropriate DUNS number or Experian file number from the LOS.
  Creditor notes submission_ID value from the LookupBusiness output.

3. GenerateScore

3A. Creditor posts GenerateScore XML input to system.
  Creditor creates GenerateScore XML input.
    If a business number was looked up, in the rpt_selection_id field of the GenerateScore input, creditor enters the DUNS number or Experian file number from the CBD section of LookupBusiness output. In the resubmission_id field, creditor enters the submission_id value from the LookupBusiness output.
    If a business number was not looked up, creditor does not enter a resubmission_id. In the rpt_selection_id field of the input, creditor enters the DUNS number or Experian file number to perform scoring with business data; creditor enters NO-REPORT to perform scoring without business data.
  Creditor wraps XML input in SOAP envelope and posts it via HTTPS.
    enginename=scoringengine
    FunctionName=GenerateScore
    Test URL=
    Production URL=

3B. Company receives GenerateScore XML input.
  FI receives XML input.
  FI authenticates user and checks IP address.
  FI generates an application submission ID.
  FI validates XML input.

3C. Company sends request to business bureau.
  Company sends application information to business bureau.

3D. Business bureau sends business credit report to Company.

3E. Company sends request to credit reporting agency.
  If business bureau pull was successful, Company sends application information to credit reporting agency.

3F. Credit reporting agency sends principal credit report(s) to Company.

3G. Company generates score.

3H. Company posts GenerateScore XML output to system.
  FI creates GenerateScore XML output. Output contains:
    Scores
    Credit reporting agency report(s)
    Business bureau report
    Adverse action codes
    Generated values
    Selected input data
  FI wraps XML output in SOAP and posts it via HTTPS. FunctionNameResponse=GenerateScoreResponse.

3I. Creditor receives GenerateScore.
  Creditor receives GenerateScore XML output.
  Creditor unwraps XML output from SOAP.

GenerateScore Function

The GenerateScore function provides consumer scores (and optionally, a business score). If one should choose a consumer score, the system purchases and pulls a CRA report for each of up to two applicants. It then generates an application score for each applicant. If there are two applicants, the application scores are unrelated to each other. If one should choose a small business score, the system generates individual consumer scores as above; in addition, it purchases and pulls a business bureau report and generates an overall application score using data from the business and up to two applicants.

There are two modes of access to the decision engine:
  Product configuration
  Application processing One or more products need to be configured before the decision engine can process applications, otherwise there would be no products to match with approved applications. Application processing can begin at any time after the first product has been configured.

The decision engine pulls credit reporting agency (CRA) and business bureau reports for submitted applications, produces a score, matches the application's relative risk with products being offered by the creditor, and returns a list of product matches along with the CRA and business bureau reports.

PerformDecision Setup and Transaction

Consumer Applications

Figure 7:
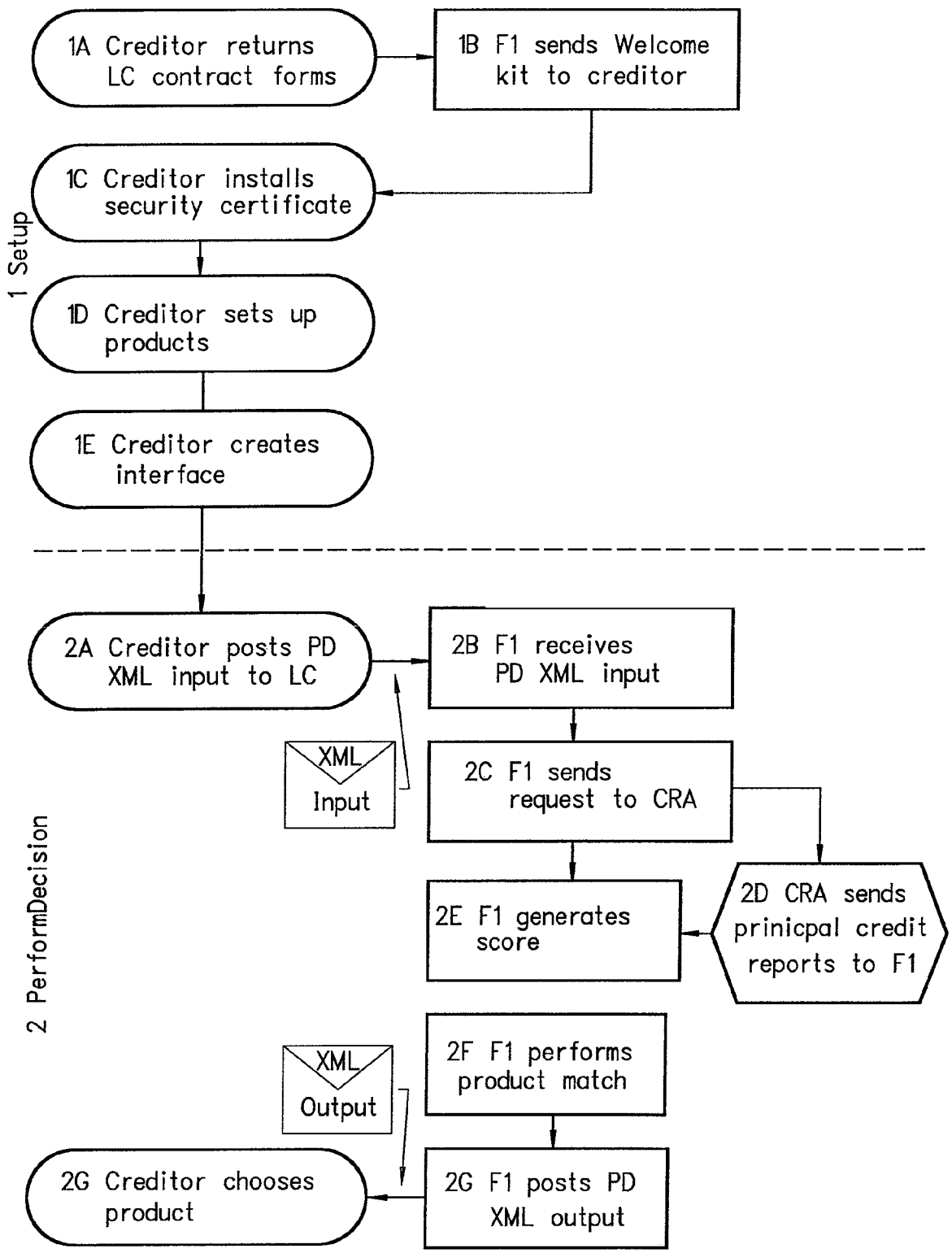
FIG. 7 is a flow diagram showing consumer application setup and a successful transaction in the decision engine according to the invention.

FIG. 7 (see, also, Table 5) shows the data flow that occurs between an institution, Company, and the credit reporting agencies during decision engine setup and a successful transaction for a consumer application.

TABLE 5

Acronyms used in Consumer Application Diagrams and Text

| Acronym | Meaning |
|---|---|
| CBD | Credit Bureau Data |
| CRA | Credit Reporting Agency (Credit Bureau) |
| FI | Fair, Isaac |
| HTTPS | HyperText Transfer Protocol (Secure) |
| IDS | Internet Delivery Services Web site |
| LC | LiquidCredit |
| PD | PerformDecision |
| SOAP | Simple Object Access Protocol |

Data Flow Steps in Consumer Setup/Transaction

1. Setup

1A. Creditor returns system contract forms.
  New system client (creditor) returns signed contract and project initiation forms.

1B. Company sends Welcome kit to creditor.
  Company sends group-level and user-level login IDs and passwords to creditor.
  Company sends instructions for installing security certificates to creditor.
  Company sends creditor list of valid scorecard IDs.

1C. Creditor installs security certificate.
   Creditor goes to the Company Digital ID Center Web site and enrolls for a security certificate.
   Creditor receives PIN, goes to the VeriSign Web site, and installs the Digital ID.
   Creditor goes to the Digital ID Center Web site and installs the security certificate.

1D. Creditor sets up products.
   Creditor creates product entries.

1E. Creditor creates interface.
   Creditor creates interface to system decision engine according to API Guide.
   Creditor works with Company to ensure that the interface works correctly.

1F. Creditors install security certificates.
   Creditors go to the Fair, Isaac Digital ID Center Web site and enroll for security certificates.
   Creditors receive PIN, go to the VeriSign Web site, and install the Digital ID.
   Creditors go to the Digital ID Center Web site and install security certificates.

1G. Creditors set up products.
   Creditors create product entries.
   Creditors inform broker when initial product entries have been made.

1H. Broker creates interface.
   Broker creates interface to LiquidCredit broker engine according to API Guide.
   Broker works with Fair, Isaac to ensure that the interface works correctly.

1I. Broker receives product info.
   Broker receives product information from creditors.

2. PerformDecision

2A. Creditor posts PerformDecision XML input to system.
   Creditor creates PerformDecision XML input.
   Creditor wraps XML input in SOAP envelope and posts it via HTTPS.
      enginename=decisionengine
      FunctionName=PerformDecision
      TestURL=
      Production URL=

2B. Company receives PerformDecision XML input.
   FI receives XML input.
   FI authenticates user and checks IP address.
   FI generates an application submission ID.
   FI validates XML input.

2C. Company sends request to credit reporting agency.

2D. Credit reporting agency sends principal credit report(s) to Company.

2E. Company generates score.

2F. Company performs product match.

2G. Company posts PerformDecision XML output to system.
   FI creates PerformDecision XML output. Output contains:
   A list of matching products or a no match reason list
   Scores
   Credit reporting agency report(s)
   Adverse action codes
   Generated values
   Selected input data
   FI wraps XML output in SOAP and posts it via HTTPS.
      FunctionNameResponse=PerformDecisionResponse.

2H. Creditor chooses product.
   Creditor receives PerformDecision XML output.
   Creditor unwraps XML output from SOAP.
   Creditor presents product choice(s) to applicant.
   Applicant selects product.

Business Applications

Figure 8:
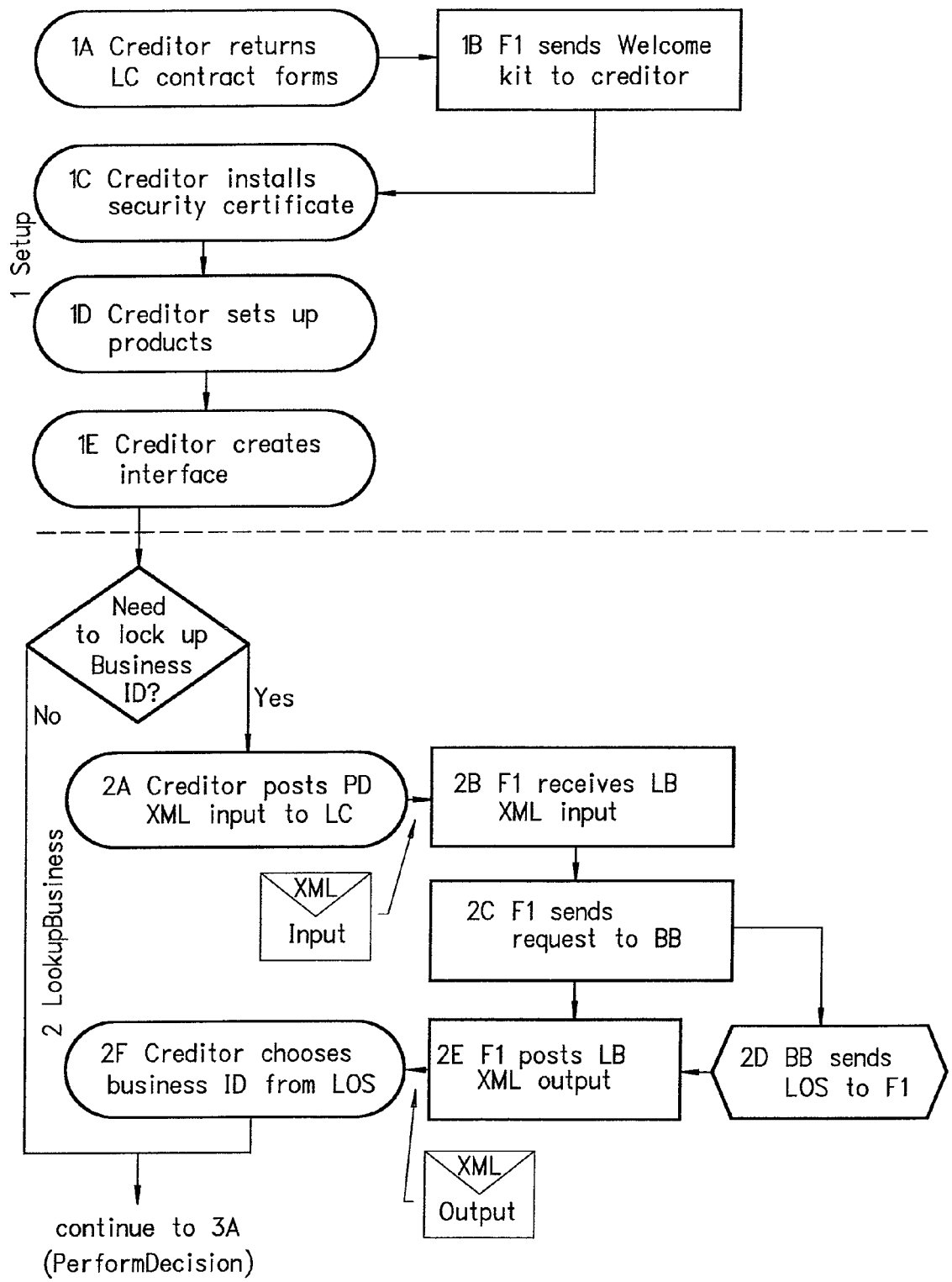
FIG. 8 is a flow diagram showing a first part of business application setup and a successful transaction in the decision engine according to the invention.
Figure 9:
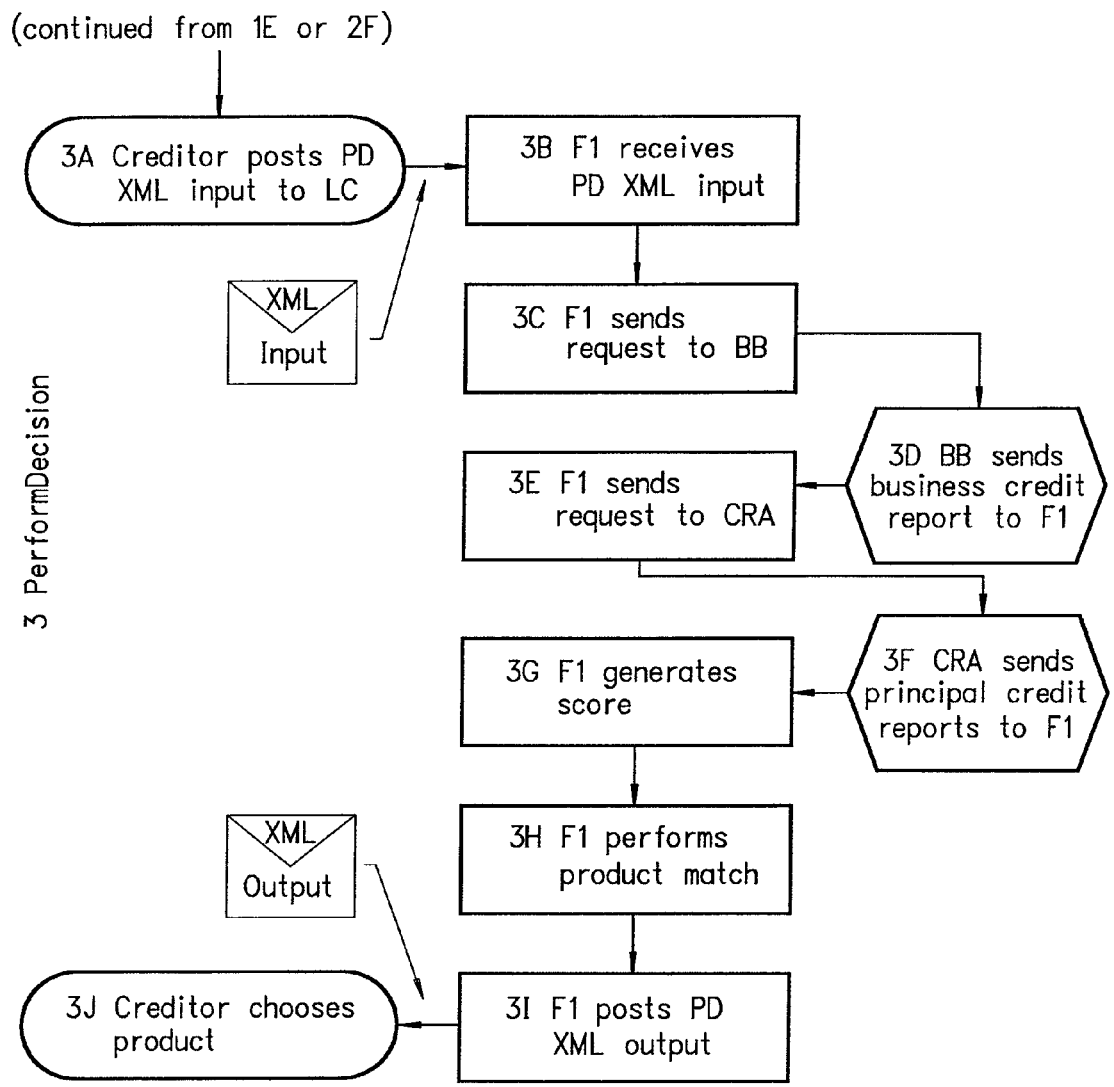
FIG. 9 is a flow diagram showing a second part of business application setup and a successful transaction in the decision engine according to the invention.

FIGS. 8 and 9 (see, also, Table 6) show the data flow that occurs between an institution, Company, the credit reporting agencies, and the business bureaus during decision engine setup and a successful transaction for a business application.

TABLE 6

Acronyms used in Business Application Diagrams and Text

| Acronym | Meaning |
| --- | --- |
| BB | Business Bureau |
| CBD | Credit Bureau Data |
| CRA | Credit Reporting Agency (Credit Bureau) |
| FI | Fair, Isaac |
| HTTPS | HyperText Transfer Protocol (Secure) |
| IDS | Internet Delivery Services Web site |
| LB | LookupBusiness |
| LC | LiquidCredit |
| LOS | List of Similars |
| PD | PerformDecision |
| SOAP | Simple Object Access Protocol |

Data Flow Steps in Business Setup/Transaction

1. Setup

1A. Creditor returns system contract forms.
   New system client (creditor) returns signed contract and project initiation forms.

1B. Company sends Welcome kit to creditor.
   Company sends group-level and user-level login IDs and passwords to creditor.
   Company sends instructions for installing security certificates to creditor.
   Company sends creditor list of valid scorecard IDs.

1C. Creditor installs security certificate.
   Creditor goes to the Company Digital ID Center Web site and enrolls for a security certificate.
   Creditor receives PIN, goes to the VeriSign Web site, and installs the Digital ID.
   Creditor goes to the Digital ID Center Web site and installs the security certificate.

1D. Creditor sets up products.
   Creditor creates product entries.

1E. Creditor creates interface.
   Creditor creates interface to system decision engine according to API Guide.
   Creditor works with Company to ensure that the interface works correctly.

Note: If the creditor does not need to look up the business' DUNS number or Experian file number, creditor skips to step 3 and calls the PerformDecision function. Otherwise, creditor performs step 2 (calls the LookupBusiness function) to obtain a list of similar businesses from which the business ID number can be obtained.

2. LookupBusiness

2A. Creditor posts LookupBusiness XML input to system.
  Creditor creates LookupBusiness XML input to system from application data source; rpt_selection_id field must be blank or missing from input.
  Creditor wraps XML input in SOAP envelope and posts it via HTTPS.
    enginename=decisionengine
    FunctionName=LookupBusiness
    Test URL=
    Production URL=

2B. Company receives LookupBusiness XML input.
  FI receives XML input.
  FI authenticates user and checks IP address.
  FI generates an application submission ID.
  FI validates XML input.

2C. Company sends request to business bureau.
  Company sends application information to business bureau (Experian or Dun & Bradstreet).

2D. Business bureau sends LOS (List of Similars) to Company.

2E. Company posts LookupBusiness XML output to system.
  FI creates LookupBusiness XML output.
  FI wraps XML output in SOAP and posts it via HTTPS.
    FunctionNameResponse=LookupBusinessResponse 2F. Creditor chooses business ID from LOS.
  Creditor receives LookupBusiness XML output.
  Creditor unwraps XML output from SOAP.
  Creditor formats CBD report.
  Creditor chooses appropriate DUNS number or Experian file number from the LOS.
  Creditor notes submission_ID value from the LookupBusiness output.

3. PerformDecision

3A. Creditor posts PerformDecision XML input to system.
  Creditor creates PerformDecision XML input.
    If a business number was looked up, in the rpt_selection_id field of the PerformDecision input, creditor enters the DUNS number or Experian file number from the CBD section of LookupBusiness output. In the resubmission_id field, creditor enters the submission_id value from the LookupBusiness output.
    If a business number was not looked up, creditor does not enter a resubmission_id. In the rpt_selection_id field of the input, creditor enters the DUNS number or Experian file number to perform scoring with business data or creditor enters NO-REPORT to perform scoring without business data.
  Creditor wraps XML input in SOAP envelope and posts it via HTTPS.
    enginename=decisionengine
    FunctionName=PerformDecision
    Test URL=
    Production URL=

3B. Company receives PerformDecision XML input.
  FI receives XML input.
  FI authenticates user and checks IP address.
  FI generates an application submission ID
  FI validates XML input.

3C. Company sends request to business bureau.
  Company sends application information to business bureau.

3D. Business bureau sends business credit report to Company.

3E. Company sends request to credit reporting agency.
  If business bureau pull was successful Company sends application information to credit reporting agency.

3F. Credit reporting agency sends principal credit report(s) to Company.

3G. Company generates score.

3H. Company performs product match.

3I. Company posts PerformDecision XML output to system.
  FI creates PerformDecision XML output. Output contains:
    A list of matching products or a no match reason list
    Scores
    Credit reporting agency report(s)
    Business bureau report
    Adverse action codes
    Generated values
    Selected input data
  FI wraps XML output in SOAP and posts it via HTTPS.
    FunctionNameResponse=PerformDecisionResponse.

3J. Creditor chooses product.
  Creditor receives PerformDecision XML output.
  Creditor unwraps XML output from SOAP.
  Creditor presents product choice(s) to applicant.
  Applicant selects product.

PerformDecision Function

The PerformDecision function provides consumer scores (and optionally, a business score). If one should choose a consumer score, the system purchases and pulls a CRA report for each of up to two applicants. It then generates an application score for each applicant. If there are two applicants, the application scores are unrelated to each other. If one should choose a small business score, the system generates individual consumer scores as above; in addition, it purchases and pulls a business bureau report and generates an overall application score using date from the business and up to two applicants.

The PerformDecision function then performs a product selection against the valid product offerings for an institution. The PerformDecision function returns bureau, score, product match, and other data. broker engine.

There are two modes of access to the broker engine:
  Product configuration
  Application processing One or more products need to be configured before the broker engine can process applications, otherwise there would be no products to match with approved applications. Application processing can begin at any time after the first product has been configured; however, creditors must first notify the broker that their products have been configured.

The broker engine's DoProductMatch function pulls credit reporting agency (CRA) and business bureau reports for submitted applications, produces a score, matches the application's relative risk with products being offered by the creditor(s), and returns a list of product matches along with the CRA and business bureau reports. After the broker accepts a product offer using the AcceptOffer function, system notifies the creditor by e-mail that accepted offers are located at a specified, secure Web site.

DoProductMatch and AcceptOffer Setup and Transaction

Consumer Applications

Figure 10:
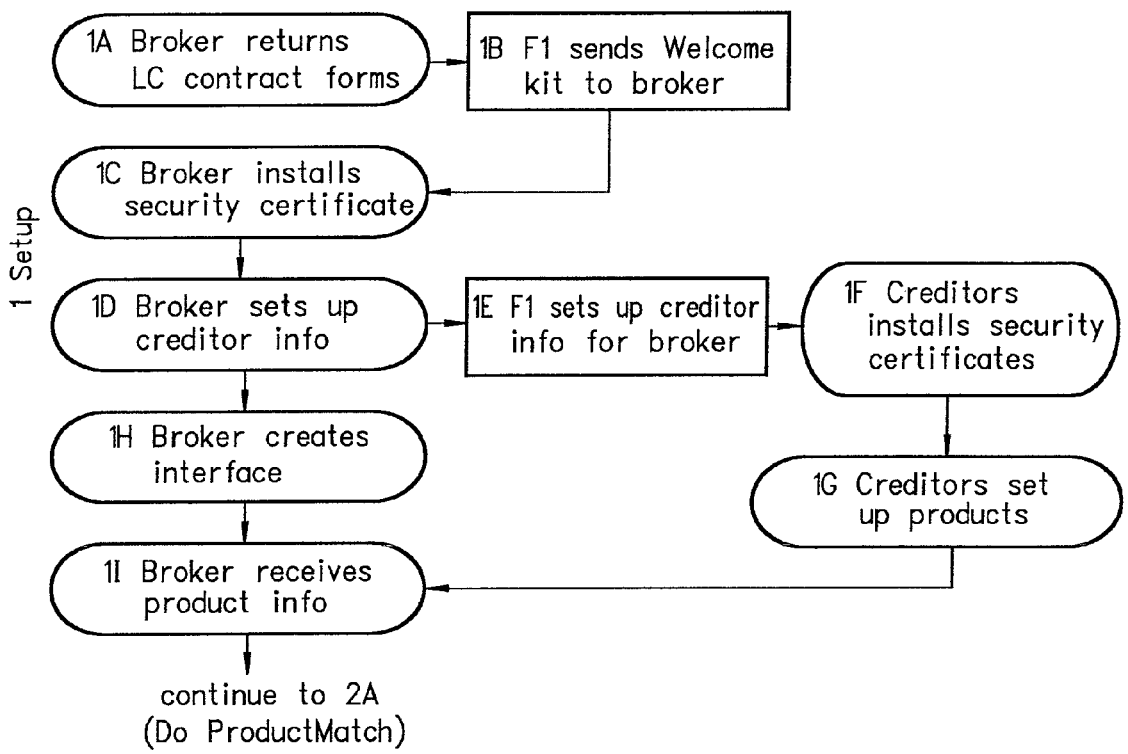
FIG. 10 is a flow diagram showing a first part of consumer application setup and a successful transaction in the broker engine according to the invention.
Figure 11:
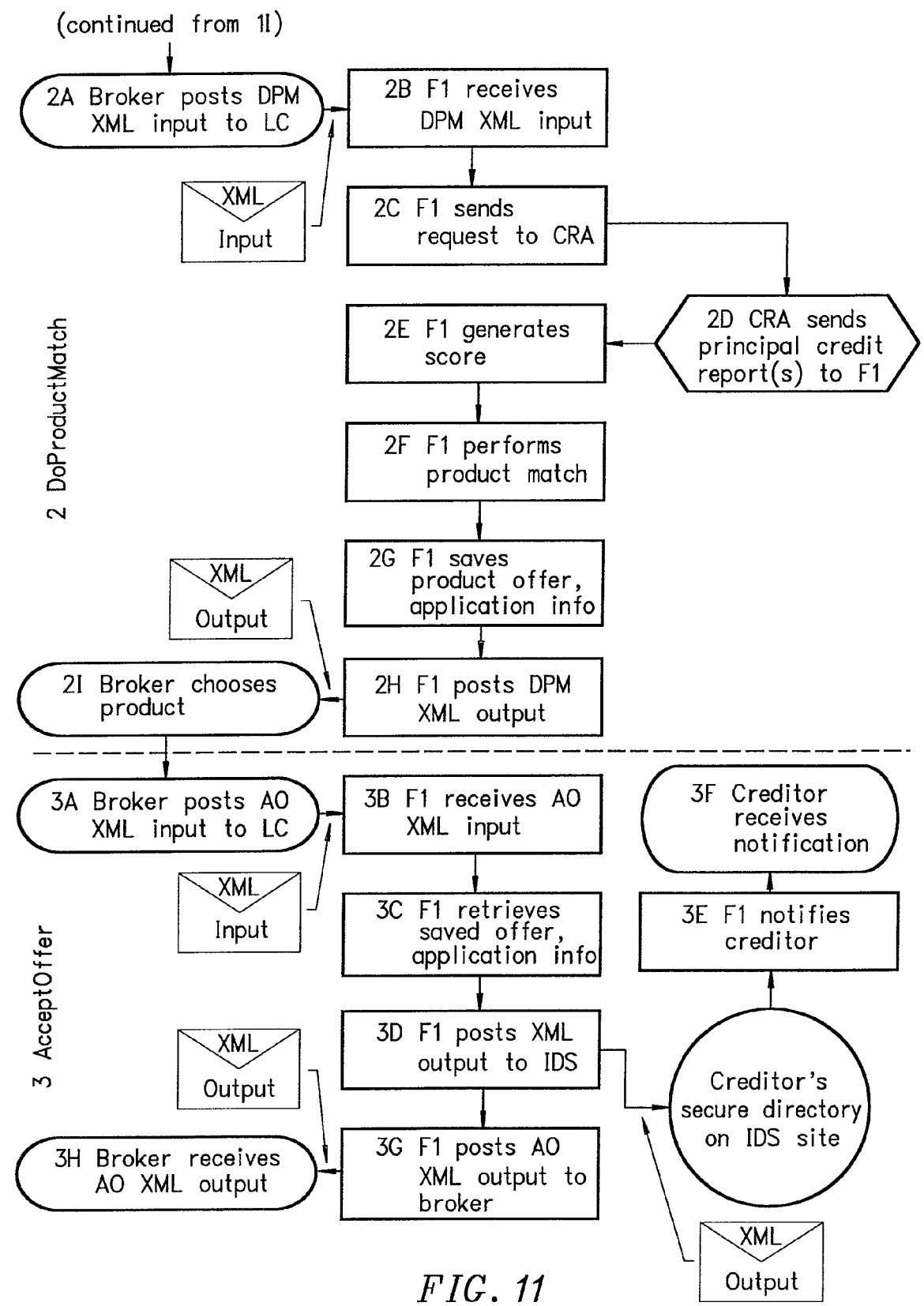
FIG. 11 is a flow diagram showing a second part of consumer application setup and a successful transaction in the broker engine according to the invention.

FIGS. 10 and 11 (see, also, Table 7) show the data flow that occurs between an institution, Company, an creditors, and the credit reporting agencies during broker engine setup and a successful transaction for a consumer application.

TABLE 7

Acronyms Consumer Application Diagrams and Text

| Acronym | Meaning |
| --- | --- |
| CBD | Credit Bureau Data |
| CRA | Credit Reporting Agency (Credit Bureau) |
| DPM | DoProductMatch |
| FI | Fair, Isaac |
| HTTPS | HyperText Transfer Protocol (Secure) |
| IDS | Internet Delivery Services Web site |
| LC | LiquidCredit |
| SOAP | Simple Object Access Protocol |

Data Flow Steps in Consumer Setup/Transaction

1. Setup

1A. Broker returns system contract forms.
   New system client (broker) returns signed contract and project initiation forms.

1B. Company sends Welcome kit to broker.
   Company sends group-level and user-level login IDs and passwords to broker.
   Company sends instructions for installing security certificates to broker.
   Company sends broker list of valid scorecard IDs.

1C. Broker installs security certificate.
   Broker goes to the Company Digital ID Center Web site and enrolls for a security certificate.
   Broker receives PIN, goes to the VeriSign Web site, and installs the Digital ID.
   Broker goes to the Digital ID Center Web site and installs the security certificate.

1D. Broker sets up creditor information.
   Broker sends creditor information (including e-mail addresses for notifications) to Company.

1E. Company sets up broker's creditor info.
   Company sends group-level and user-level login IDs and passwords to creditors.
   Company sends instructions for installing security certificates to creditors.

1F. Creditors install security certificates.
   Creditors go to the Company Digital ID Center Web site and enroll for security certificates.
   Creditors receive PIN, go to the VeriSign Web site, and install the Digital ID.
   Creditors go to the Digital ID Center Web site and install security certificates.

1G. Creditors set up products.
   Creditors create product entries.
   Creditors inform broker when initial product entries have been made.

1H. Broker creates interface.
   Broker creates interface to system broker engine according to API Guide.
   Broker works with Company to ensure that the interface works correctly.

1I. Broker receives product info.
   Broker receives product information from creditors.

2. DoProductMatch

2A. Broker posts DoProductMatch XML input to system.
   Broker creates DoProductMatch XML input.
   Broker wraps XML input in SOAP envelope and posts it via HTTPS.
      enginename=brokerengine
      FunctionName=DoProductMatch
      Test URL=
      Production URL=

2B. Company receives DoProductMatch XML input.
   FI receives XML input.
   FI authenticates user and checks IP address.
   FI generates an application submission ID.
   FI validates XML input.

2C. Company sends request to credit reporting agency.

2D. Credit reporting agency sends principal credit report(s) to Company.

2E. Company generates score.

2F. Company performs product match.

2G. Company saves product offer, application information.

2H. Company posts DoProductMatch XML output to system.
   FI creates DoProductMatch XML output. Output contains:
      A list of matching products or a no match reason list
      Scores
      Credit reporting agency report(s)
      Adverse action codes
      Generated values
      Selected input data
   FI wraps XML output in SOAP and posts it via HTTPS.
      FunctionNameResponse=DoProductMatchResponse.

2I. Broker chooses product.
   Broker receives DoProductMatch XML output.
   Broker unwraps XML output from SOAP.
   Broker presents product choice(s) to applicant.
   Applicant selects product.
   Broker notes product_match_ID of selected product.
   Broker notes DoProductMatch submission_id.

Note: After receiving the DoProductMatch output, the broker can notify the creditor about product acceptance by calling the AcceptOffer function, or by contacting the creditor directly.

3. AcceptOffer

3A. Broker posts AcceptOffer XML input to system.
   Broker creates AcceptOffer XML input to system; input must contain:
      product_match_ID
      resubmission_ID (submission_id from DoProductMatch XML output)
   Broker wraps XML input in SOAP envelope and posts it via HTTPS.
      enginename=brokerengine
      FunctionName=AcceptOffer
      Test URL=
      Production URL=

3B. Company receives AcceptOffer XML input.
   FI receives XML input.
   FI authenticates user and checks IP address.
   FI validates XML input.
   FI ensures offer has not already been accepted.
   FI ensures offer is still valid.

3C. Company retrieves saved offer, application information.

3D. Company posts XML output to IDS.
   FI creates AcceptOffer XML output; Output contains:
      broker information
      product information
      cached credit application data
      Consumer Response information from DoProductMatch output
   FI posts XML output to the creditor's secure directory on Company's IDS Web site.

3E. Company notifies creditor.
FI sends encrypted email to creditor; email contains URL for the posting sent to the IDS Web site.

3F. Creditor receives notification.
   Creditor receives email from Company.
   Creditor enters URL in browser.
   Creditor retrieves product acceptance information from IDS Web site.

3G. Company posts AcceptOffer XML output to broker.
   FI creates AcceptOffer XML output containing the creditor_ID for the accepted product offer.

3H. Broker receives AcceptOffer XML output.

Business Applications

Figure 12:
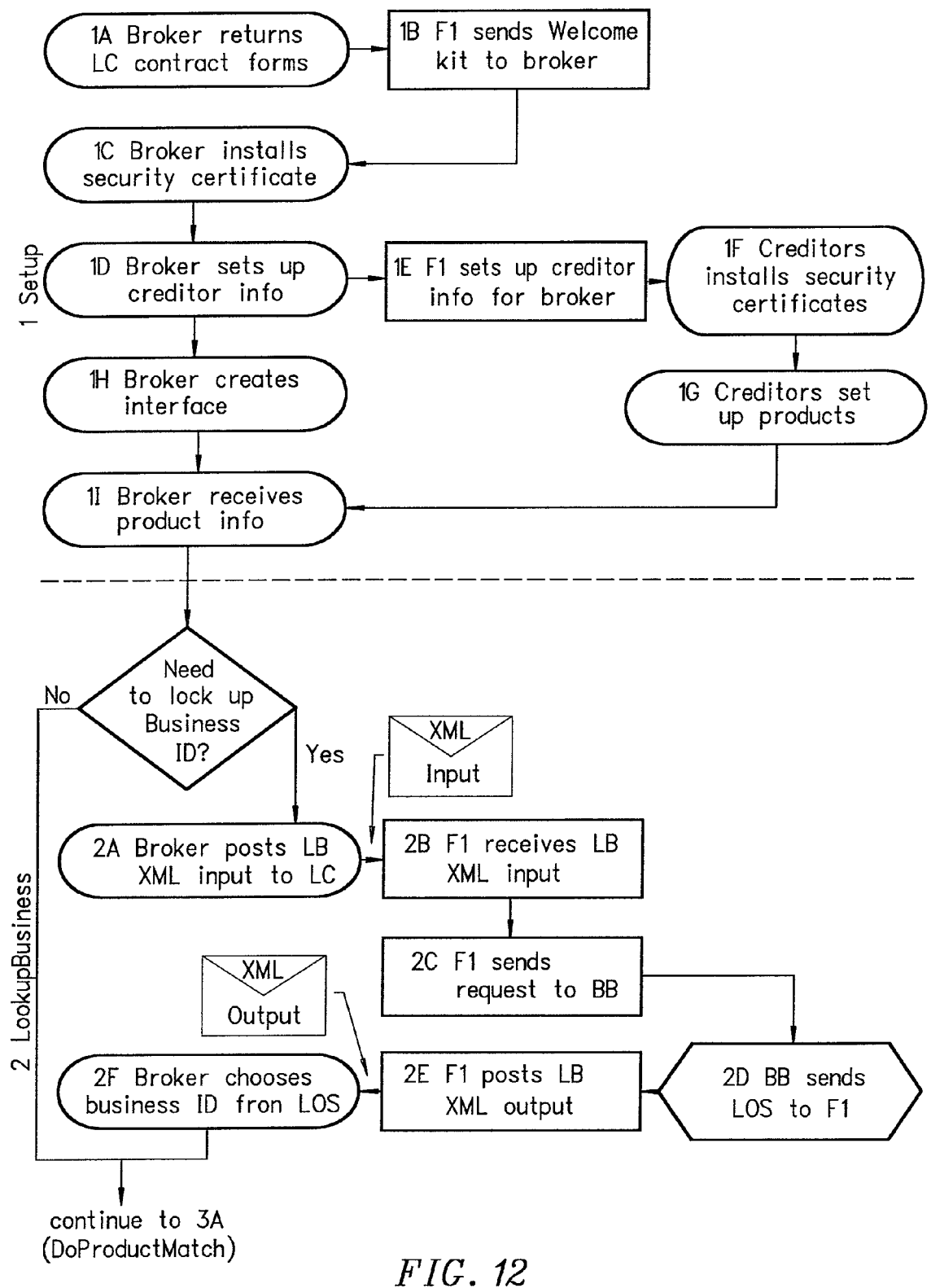
FIG. 12 is a flow diagram showing a first part of business application setup and a successful transaction in the broker engine according to the invention.
Figure 13:
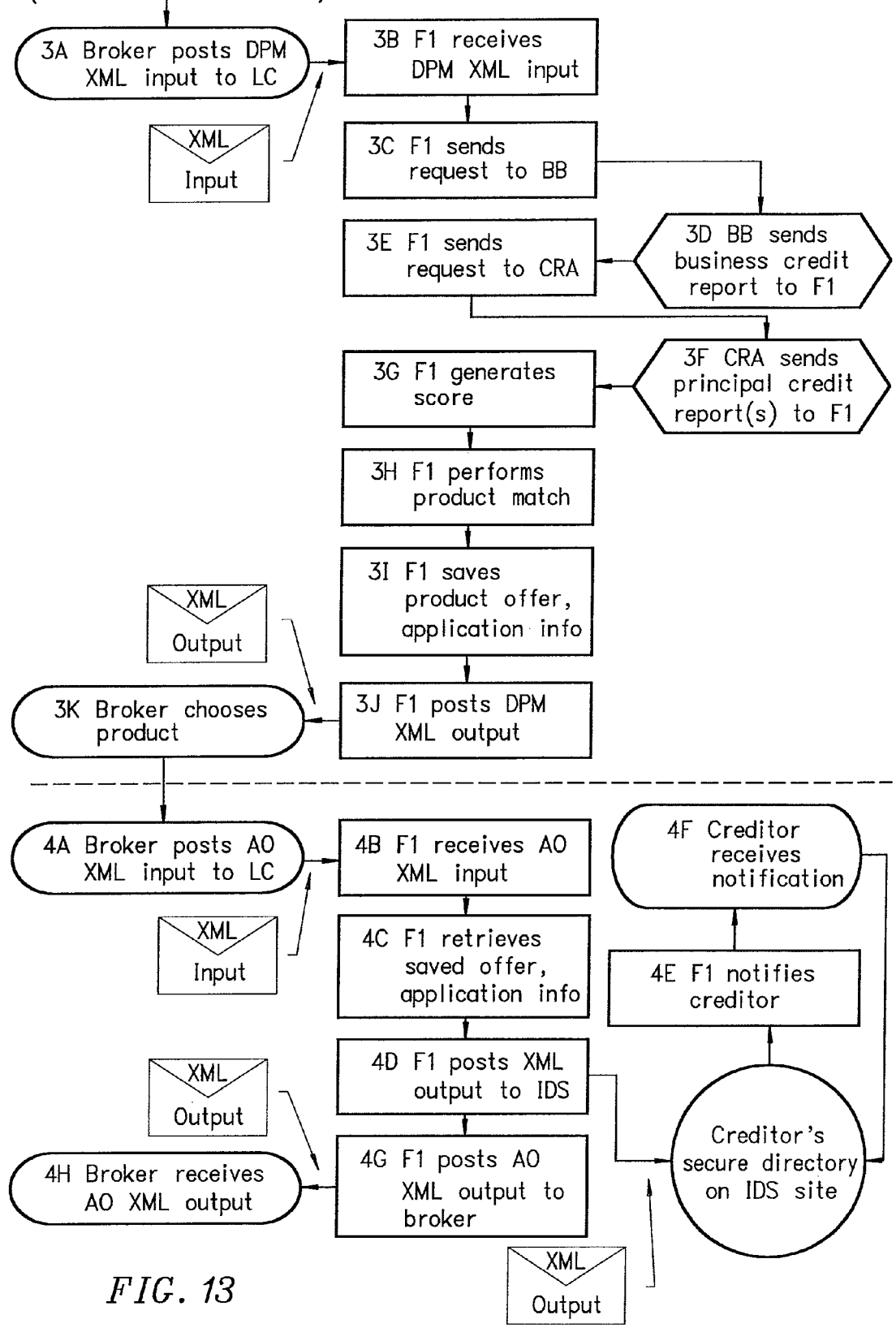
FIG. 13 is a flow diagram showing a second part of consumer application setup and a successful transaction in the broker engine according to the invention.

FIGS. 12 and 13 (see, also, Table 8) show the data flow that occurs between an institution, Company, an creditors, the credit reporting agencies, and the business bureaus during broker engine setup and a successful transaction for a business application.

TABLE 8

Acronyms used in Business Application Diagrams and Text

| Acronym | Meaning |
|---------|---------|
| BB | Business Bureau |
| CBD | Credit Bureau Data |
| CRA | Credit Reporting Agency (Credit Bureau) |
| DPM | DoProductMatch |
| FI | Fair, Isaac |
| HTTPS | HyperText Transfer Protocol (Secure) |
| IDS | Internet Delivery Services Web site |
| LB | LookupBusiness |
| LC | LiquidCredit |
| LOS | List of Similars |
| SOAP | Simple Object Access Protocol |

Data Flow Steps in Business Setup/Transaction

1. Setup

1A. Broker returns system contract forms.
   New system client (broker) returns signed contract and project initiation forms.

1B. Company sends Welcome kit to broker.
   Company sends group-level and user-level login IDs and passwords to broker.
   Company sends instructions for installing security certificates to broker.
   Company sends broker list of valid scorecard IDs.

1C. Broker installs security certificate.
   Broker goes to the Company Digital ID Center Web site and enrolls for a security certificate.
   Broker receives PIN, goes to the VeriSign Web site, and installs the Digital ID.
   Broker goes to the Digital ID Center Web site and installs the security certificate.

1D. Broker sets up creditor information.
   Broker sends creditor information (including e-mail addresses for notifications) to Company.

1E. Company sets up broker's creditor info.
   Company sends group-level and user-level login IDs and passwords to creditors.
   Company sends instructions for installing security certificates to creditors.
   Broker wraps XML input in SOAP envelope and posts it via HTTPS.
   enginename=brokerengine
   FunctionName=LookupBusiness
   Test URL=
   Production URL=

2B. Company receives LookupBusiness XML input.
   FI receives XML input.
   FI authenticates user and checks IP address.
   FI generates an application submission ID.
   FI validates XML input.

2C. Company sends request to business bureau.
   Company sends application information to business bureau (Experian or Dun & Bradstreet).

2D. Business bureau sends LOS (List of Similars) to Company.

2E. Company posts LookupBusiness XML output to system.
   FI creates LookupBusiness XML output.
   FI wraps XML output in SOAP and posts it via HTTPS.
   FunctionNameResponse=LookupBusinessResponse 2F. Broker chooses business ID from LOS.
   Broker receives LookupBusiness XML output.
   Broker unwraps XML output from SOAP.
   Broker formats CBD report.
   Broker chooses appropriate DUNS number or Experian file number from the LOS.
   Broker notes submission_ID value from the LookupBusiness output.

3. DoProductMatch

3A. Broker posts DoProductMatch XML input to system.
   Broker creates DoProductMatch XML input.
      If a business number was looked up, in the rpt_selection_id field of the DoProductMatch input, broker enters the DUNS number or Experian file number from the CBD section of LookupBusiness output. In the resubmission_id field, broker enters the submission_id value from the LookupBusiness output.
      If a business number was not looked up, broker does not enter a resubmission_id. In the rpt_selection_id field of the input, broker enters the DUNS number or Experian file number to perform scoring with business data or broker enters NO-REPORT to perform scoring without business data.
   Broker wraps XML input in SOAP envelope and posts it via HTTPS.
   enginename=brokerengine
   FunctionName=DoProductMatch Test URL=
Production URL=

3B. Company receives DoProductMatch XML input.
FI receives XML input.
FI authenticates user and checks IP address.
FI generates an application submission ID.
FI validates XML input.

3C. Company sends request to business bureau.
Company sends application information to business bureau.

3D. Business bureau sends business credit report to Company.

3E. Company sends request to credit reporting agency.
If business bureau pull was successful, Company sends application information to credit reporting agency.

3F. Credit reporting agency sends principal credit report(s) to Company.

3G. Company generates score.

3H. Company performs product match.

3I. Company saves product offer, application information.

3J. Company posts DoProductMatch XML output to system.
FI creates DoProductMatch XML output. Output contains:
A list of matching products or a no match reason list
Scores
Credit reporting agency report(s)
Business bureau report
Adverse action codes
Generated values
Selected input data
FI wraps XML output in SOAP and posts it via HTTPS.
FunctionNameResponse=DoProductMatchResponse.

3K. Broker chooses product.
Broker receives DoProductMatch XML output.
Broker unwraps XML output from SOAP.
Broker presents product choice(s) to applicant.
Applicant select product.
Broker notes product_match_ID of selected product.
Broker notes DoProductMatch submission_id.

Note: After receiving the DoProductMatch output, the broker can notify the creditor about product acceptance by calling the AcceptOffer function, or by contacting the creditor directly.

4. AcceptOffer

4A. Broker posts AcceptOffer XML input to system.
Broker creates AcceptOffer XML input to system; input must contain:
product_match_ID
resubmission_ID (submission_id from DoProductMatch XML output)
Broker wraps XML input in SOAP envelope and posts it via HTTPS.
enginename=brokerengine
FunctionName=AcceptOffer
Test URL=
Production URL=

4B. Company receives AcceptOffer XML input.
FI receives XML input.
FI authenticates user and checks IP address.
FI validates XML input.
FI ensures offer has not already been accepted.
FI ensures offer is still valid.

4C. Company retrieves saved offer, application information.

4D. Company posts XML output to IDS.
FI creates AcceptOffer XML output; Output contains:
broker information
product information
cached credit application data
Consumer Response and Business Response information from
DoProductMatch output
FI posts XML output to the creditor's secure directory on Company's IDS Web site.

4E. Company notifies creditor.
FI sends encrypted email to creditor; email contains URL for the posting sent to the IDS Web site.

4F. Creditor receives notification.
Creditor receives email from Company.
Creditor enters URL in browser.
Creditor views product acceptance information on IDS Web site.

4G. Company posts AcceptOffer XML output to broker.
FI creates AcceptOffer XML output containing the creditor_ID for the accepted product offer.

4H. Broker receives AcceptOffer XML output.

DoProductMatch Function

The DoProductMatch function provides consumer scores (and optionally, a business score). If one should choose a consumer score, the system purchases and pulls a CRA report for each of up to two applicants. It then generates an application score for each applicant. If there are two applicants, the application scores are unrelated to each other. If one should choose a small business score, the system generates individual consumer scores as above; in addition, it purchases and pulls a business bureau report and generates an overall application score using date from the business and up to two applicants.

The DoProductMatch API function then performs a product selection against the valid product offerings set up by an creditors. The DoProductMatch function returns bureau, score, product match, and other data.

AcceptOffer Function

The AcceptOffer function compares a supplied product_match_id with those returned from DoProductMatch. If the supplied product_match_id is valid, the function does the following:
Returns data associated with the transaction and the offering creditor to the client (broker) calling system.
Posts the XML output file with application data on the creditor's secure directory on Company's Internet Delivery Services (IDS) Web site.
Sends an e-mail to the offering creditor informing them that an offer has been accepted, with a link to their secure directory on the IDS Web site for retrieving the XML output file.

Physical Data Model and Listing

Model Description

Figure 14A2:
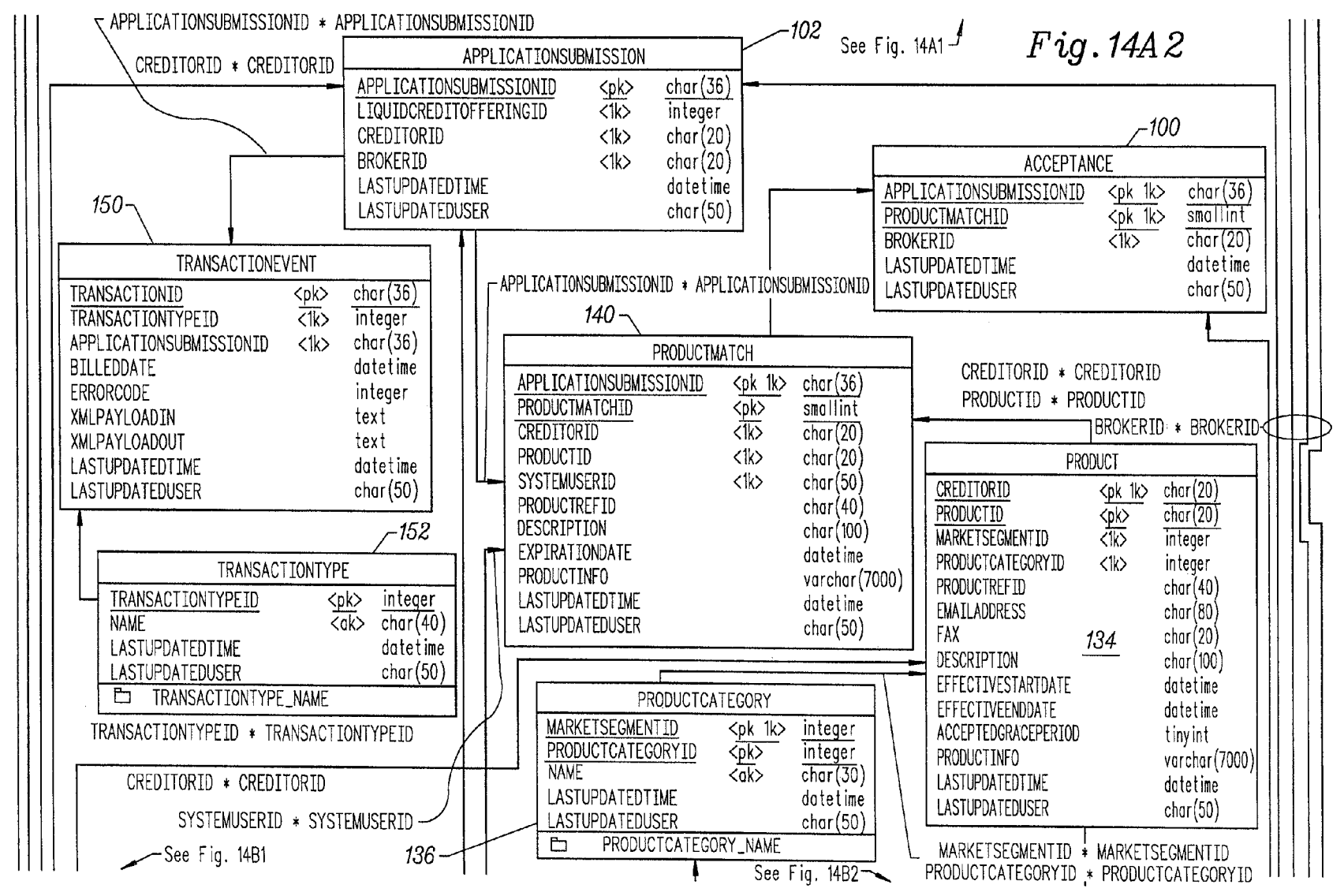

The overall objectives of the data model (see FIGS. 14a-14b) are:
1) Quick to market—only basic functionality in data design is to be included.
2) Flexibility—through the use of stored procedures, the underlying data design can change without an impact on any application code. Also, an effort has been made to conform to standard code lengths and data types in the case that the database migrates to another platform.

The major goals of this model include:
1) Store creditor information for billing.
2) Store user application rights for security (this is used within application code not DBMS security).
3) Store product match characteristic for decision criteria.
4) Store product characteristic for decision criteria.
5) Store creditor/broker relationships.
6) Store Score Card assignments.

This model does not contain any parsed consumer level data and does not attempt to create any structures for analytic.

ACCEPTANCE TABLE

Description
  The acceptance table 100 is an associative table that stores product applications for a given Creditor/Broker combination.

APPLICATIONSUBMISSIONID

Description
  Identification of the application submission that the acceptance applies to.

PRODUCTMATCHID

Description
  Identification of the product match that the acceptance applies to.

BROKERID

Description
  Identification of the broker that accepted the product.

LASTUPDATEDTIME

Description
  Timestamp of last update.

LASTUPDATEDUSER

Description
  User Id of last update.

APPLICATIONSUBMISSION TABLE

Description
  The application submission table 102 is an associative table that holds foreign key reference to Creditor/Broker/system Offering combinations.

APPLICATIONSUBMISSIONID

Description
  Globally unique identification of the application submission.

LIQUIDCREDITOFFERINGID

Description
  Identification of the system offering that applies to the application.

CREDITORID

Description
  Identification of the creditor that submitted the application.

BROKERID

Description
  Identification of the broker that submitted the application.

LASTUPDATEDTIME

Description
  Timestamp of last update.

LASTUPDATEDUSER

Description
  User Id of last update.

AUDITTABLE TABLE

Description
  The auditable table 104 keeps track of changes made to the configuration of an 'Application', 'Product/Match' or User information.

AUDITTYPEID

Description
  Identification of the type of audit entry.

CREDITORID

Description
  Creditor Id that the audit entry applies to.

SYSTEMUSERID

Description
  User Id that the audit entry applies to.

BROKERID

Description
  Broker Id that the audit entry applies to.

DATA

Description
  Textual description for the audit entry.

LASTUPDATEDTIME

Description
  Timestamp of last update.

LASTUPDATEDUSER

Description
  User Id of last update.

AUDITTYPE TABLE

Description
  In the audit type table 106, audits are classified in types.

AUDITTYPEID

Description
  Numerical Id of an audit type.

NAME

Description
  Unique name of the audit type. For example 'Product Setup', 'Add User', 'Change User Password'.

LASTUPDATEDTIME

Description
  Timestamp of last update.

LASTUPDATEDUSER

Description
  User Id of last update.

BROKER TABLE

Description
  The broker table 108 stores the Broker Id that is associated with a Customer.

BROKERID

Description
Identification of the broker.

CUSTOMERID

Description
Customer Id assigned to a broker for billing purposes.

LASTUPDATEDTIME

Description
Timestamp of last update.

LASTUPDATEDUSER

Description
User Id of last update.

BROKERAGEAGREEMENT TABLE

Description
The brokerage agreement table 110 stores the associations of CreditorId and BrokerId.

BROKERID

Description
Identification of the broker in the brokerage agreement.

CREDITORID

Description
Identification of the creditor in the brokerage agreement.

CREDITORREFID

Description
The Id that the financial institution use to identify creditors.

BROKERREFID

Description
The Id that the financial institution use to identify brokers.

LASTUPDATEDTIME

Description
Timestamp of last update.

LASTUPDATEDUSER

Description
User Id of last update.

BROKERSCORECARDASSIGNMENT TABLE

Description
The broker scorecard assignment table 112 stores Score-Card Identifiers.

BROKERID

Description
Identification of the broker in the broker/schema assignment.

EXTERNALID

Description
External identification of a score card used by the broker.

SCORECARDID

Description
FICO internal scorecard Id mapped to the external score card Id used by a broker.

LASTUPDATEDTIME

Description
Timestamp of last update.

LASTUPDATEDUSER

Description
User Id of last update.

BROKERUSER TABLE

Description
The broker user table 114 associates User Ids and Broker Ids.

SYSTEMUSERID

Description
Identification of the user for the broker/user assignment.

BROKERID

Description
Identification of the broker for the broker/user assignment.

LASTUPDATEDTIME

Description
Timestamp of last update.

LASTUPDATEDUSER

Description
User Id of last update.

CHARACTERISTIC TABLE

Description
The characteristic table 116 holds the definition of a Product Characteristic and the direct mapping to the XML Characteristic Name (NAME attribute in this table).

CHARACTERISTICID

Description
This is an enumerated value to uniquely identify the characteristic.

NAME

Description
Name of the characteristic. For example 'App Score', 'Bankruptcy on CB', 'Zip Code', 'Age of Applicant'.
The combo of NAME and MARKETSEGMENTID must be unique.

MARKETSEGMENTID

Description
Numerical identification of the market segment.

DATATYPEID

Description
This is an enumerated value to uniquely identify the data type.

DATALENGTH

Description
The length of the field.

REASONCODE

Description
Policy reason code.

NOINFORMVALUE

Description
Value to be assigned if no information is supplied (missing data). This corresponds with a "Q" attribute value for the characteristic in the XML payload.

WORSTVALUE

Description
This is the worst possible value for the characteristic. This value gets assigned for 'not answered' (SPACE) in the XML payload.

SCOREDFLAG

Description
Indicates whether the characteristic is score related.

BROKERFLAG

Description
Indicates whether the characteristic applies to the decision engine offering.

DECISIONENGINEFLAG

Description
Indicates whether the characteristic applies to the decision engine offering.

RANGECOMPARISONID

Description
Range comparison id that the characteristic applies to.

LASTUPDATEDTIME

Description
Timestamp of last update.

LASTUPDATEDUSER

Description
User Id of last update.

CONTACTTYPE TABLE

Description
The contact type table 118 stores the different types of Contacts. For example 'Broker Notification Contact', 'Billing'.

CONTACTTYPEID

Description
Numerical identification of a contact type for a customer.

NAME

Description
Unique name of the contact type.

LASTUPDATEDTIME

Description
Timestamp of last update.

LASTUPDATEDUSER

Description
User Id of last update.

CREDITOR TABLE

Description
The creditor table 120 stores unique identifier and email address for each Creditor.

CREDITORID

Description
Identification of the creditor.

CUSTOMERID

Description
Customer Id assigned to the creditor for billing purposes.

EMAILADDRESS

Description
Email address of the creditor.

LASTUPDATEDTIME

Description
Timestamp of last update.

LASTUPDATEDUSER

Description
User Id of last update.

CREDITORSCORECARDASSIGNMENT TABLE

Description
The credit scorecard assignment table 122 associates a Creditor with a internal and external scorecard id.

CREDITORID

Description
Identification of the creditor in the creditor/score card assignment.

EXTERNALID

Description
External identification of a score card used by the creditor.

SCORECARDID

Description
FICO internal scorecard ID mapped to the external score card ID used by a creditor.

LASTUPDATEDTIME

Description
Timestamp of last update.

LASTUPDATEDUSER

Description
User Id of last update.

CREDITORUSER TABLE

Description
The credit or user table 124 associates a creditor with system users.

SYSTEMUSERID

Description
Identification of the user for the creditor/user assignment.

CREDITORID

Description
Identification of the creditor for the creditor/user assignment.

LASTUPDATEDTIME

Description
Timestamp of last update.

LASTUPDATEDUSER

Description
User Id of last update.

CUSTOMER TABLE

Description
The customer table 160 holds customer information for billing.

CUSTOMERID

Description
Identification of the customer, used for billing purposes.

NAME

Description
Descriptive name for the customer.

ADDRESS

Description
Address of the customer.

LASTUPDATEDTIME

Description
Timestamp of last update.

LASTUPDATEDUSER

Description
User Id of last update.

CUSTOMERCONTACT TABLE

Description
The customer contact table 126 holds individual contact name/address/phone for customer contacts.

CUSTOMERID

Description
Identification of the customer that the contact belongs to.

CONTACTNUMBER

Description
Unique contact number within the scope of a particular customer.

CONTACTTYPEID

Description
Numerical identification of a contact type for a customer.

ACTIVEFLAG

Description
Indicator whether the customer contact is currently active or not. NAME Description
Descriptive name for the customer contact.

ADDRESS

Description
Address of the customer.

EMAILADDRESS

Description
Email Address of the customer contact.

PHONE

Description
Phone number of the customer contact.

FAX

Description
Fax phone number of the customer contact.

LASTUPDATEDTIME

Description
Timestamp of last update.

LASTUPDATEDUSER

Description
User Id of last update.

DATATYPE TABLE

Description
The data type table 128 holds the data types for the characteristics.

DATATYPEID

Description
This is an enumerated value to uniquely identify the data type.

NAME

Description
Unique name of the data type. For example 'Integer', 'Double', 'String'.

LASTUPDATEDTIME

Description
Timestamp of last update.

LASTUPDATEDUSER

Description
User Id of last update.

DECISIONPARTY TABLE

Description
The decision party table 130 holds the party that the decision applies to. Example co-app or applicant.

DECISIONPARTYID

Description
This is an enumerated value to uniquely identify the decision party.

NAME

Description
Unique name of the decision party. For example 'Applicant', 'Co-Applicant', 'App and Co-App', 'Decision Party', 'No Decision Party'.

LASTUPDATEDTIME

Description
Timestamp of last update.

LASTUPDATEDUSER

Description
User Id of last update.

LIQUIDCREDITOFFERING TABLE

Description
The liquid credit offering table 158 holds the numeric identification for the offering along with its name.

LIQUIDCREDITOFFERINGID

Description
Numerical identification of the system offering.

NAME

Description
Unique name of the system offering. For example 'Decision Engine', 'Broker Engine', 'Scoring Engine', 'App Engine'.

LASTUPDATEDTIME

Description
 Timestamp of last update.

LASTUPDATEDUSER

Description
 User Id of last update.

MARKETSEGMENT TABLE

Description
 The market segment table 132 holds the numerical identification and name for a market segment.

MARKETSEGMENTID

Description
 Numerical identification of the market segment.

NAME

Description
 Unique name of the market segment. For example 'Consumer', 'Small Business'.

LASTUPDATEDTIME

Description
 Timestamp of last update.

LASTUPDATEDUSER

Description
 User Id of last update.

PRODUCT TABLE

Description
 The product table 134 contains shared attributes between Consumer Products and Small Business Products.

CREDITORID

Description
 Identification of the creditor that offers the product.

PRODUCTID

Description
 Identification of the product offered by the creditor.

MARKETSEGMENTID

Description
 Identification of the Market Segment that the product belong to.

PRODUCTCATEGORYID

Description
 Identification of the product category of the product.

PRODUCTREFID

EMAILADDRESS

FAX

Description

Description
 Text description of the product.

EFFECTIVESTARTDATE

Description
 Date when the product becomes in effect.

EFFECTIVEENDDATE

Description
 Date when the product is no longer effective.

ACCEPTEDGRACEPERIOD

Description
 The number of days the offer is valid.

PRODUCTINFO

Description
 Free form text that is dictated by the creditor. These are terms and conditions.

LASTUPDATEDTIME

Description
 Timestamp of last update.

LASTUPDATEDUSER

Description
 User Id of last update.

PRODUCTCATEGORY TABLE

Description
 The product category table 136 holds the numeric identification and name for the product category.

MARKETSEGMENTID

Description
 Identification of the market segment that the product category belongs to.

PRODUCTCATEGORYID

Description
 Numerical identification of the product category.

NAME

Description
 Unique name of the product category. For example 'Consumer/Revolving', 'Consumer/Direct', 'Small Business/Revolving', 'Small Business/Direct'.

LASTUPDATEDTIME

Description
 Timestamp of last update.

LASTUPDATEDUSER

Description
 User Id of last update.

PRODUCTCHARACTERISTIC TABLE

Description
 The product characteristic table 138 holds the characteristics of the product attribute.

CREDITORID

Description
 Identification of the creditor that offers the product.

PRODUCTID

Description
 Identification of the product offered by the creditor.

CHARACTERISTICID

Description
 This is an enumerated value to uniquely identify the characteristic.

DECISIONPARTYID

Description
This is an enumerated value to uniquely identify the decision party.

LOWVALUE

Description
Low cutoff value for the characteristic. This value is always stored as a string, but needs to be converted to the proper type depending on the data type for the characteristic in the CHARACTERISTIC table. Every characteristic will always have a low value.

HIGHVALUE

Description
High cutoff value for the characteristic. This value is always stored as a string, but needs to be converted to the proper type depending on the data type for the characteristic in the CHARACTERISTIC table. A characteristic will only have a high value if the RANGEFLAG in the CHARACTERISTIC table is set to 'Y'.

LASTUPDATEDTIME

Description
Timestamp of last update.

LASTUPDATEDUSER

Description
User Id of last update.

PRODUCTMATCH TABLE

Description
The product match table 140 associates an application submission with a creditor and product along with the length of time the offer is valid.

APPLICATIONSUBMISSIONID

Description
Identification of the application submission that the product match applies to.

PRODUCTMATCHID

Description
Sequence number of the product match for an application submission.

CREDITORID

Description
Identification of the creditor that the product match applies.

PRODUCTID

Description
Identification of the product that the product match applies to.

SYSTEMUSERID

Description
User Id that originally requested the product match.

PRODUCTREFID

Description

Description
Free form text description of the product match.

EXPIRATIONDATE

Description
The date the product match expires.

PRODUCTINFO

Description
Information regarding the product like terms and conditions.

LASTUPDATEDTIME

Description
Timestamp of last update.

LASTUPDATEDUSER

Description
User Id of last update.

RANGECOMPARISON TABLE

Description
The range comparison table 142 holds the detail of how the product characteristic low value and high value should be used.

RANGECOMPARISONID

Description
Identification of the range comparison.

NAME

Description
Unique name of the range comparison. For example 'Minimum', 'Maximum', 'Equals', 'Range'.

LASTUPDATEDTIME

Description
Timestamp of last update.

LASTUPDATEDUSER

Description
User Id of last update.

SCORECARD TABLE

Description
The scorecard table 144 holds the numeric identifier and name for the score card.

SCORECARDID

Description
Identification of the score card.

NAME

Description
Unique name of the score card.

LASTUPDATEDTIME

Description
Timestamp of last update.

LASTUPDATEDUSER

Description
User Id of last update.

SYSTEMGLOBALVARIABLE TABLE

Description
The system global variable table 146 holds any system wide variables.

NAME

Description
Unique name of the system variable.

EFFECTIVEDATE

Description
 The date the system global variable value is effective.

ENDDATE

Description
 The date the global system value is no longer valid.

DATATYPEID

Description
 This is an enumerated value to uniquely identify the data type.

VALUE

Description
 This value is always stored as a string, but needs to be converted to the proper data type.

LASTUPDATEDTIME

Description
 Timestamp of last update.

LASTUPDATEDUSER

Description
 User Id of last update.

SYSTEMUSER TABLE

Description
 The system user table 148 holds the identification of users for authentication purposes.

SYSTEMUSERID

Description
 Identification of a user for authentication purposes.

LIQUIDCREDITOFFERINGID

Description
 Identification of the Liquid credit offering that is assigned to the user.

USERROLEID

Description
 Identification of the user role that is assigned to the user.

USERTYPEID

Description
 Identification of the user type that is assigned to the user.

PASSWORD

Description
 Password for the user account. Will be encrypted.

ACTIVEFLAG

Description
 Indicator whether the user is currently active or not.

IPADDRESS

Description
 IP address of the user machine.

LASTUPDATEDTIME

Description
 Timestamp of last update.

LASTUPDATEDUSER

Description
 User Id of last update.

TRANSACTIONEVENT TABLE

Description
 The transaction event table 150 contains a record for each credit bureau/score/product match request.

TRANSACTIONID

Description
 Identification of the transaction.

TRANSACTIONTYPEID

Description
 Identification of the transaction type for the transaction.

APPLICATIONSUBMISSIONID

Description
 Identification of the application submission that the transaction belongs to.

BILLEDDATE

Description
 Date when the transaction is billed.

ERRORCODE

Description
 Is not null if an error occurs in the transaction. The code will represent the type of error.

XMLPAYLOADIN

Description
 The inbound XML stream.

XMLPAYLOADOUT

Description
 The outbound XML stream.

LASTUPDATEDTIME

Description
 Timestamp of last update.

LASTUPDATEDUSER

Description
 User Id of last update.

TRANSACTIONTYPE TABLE

Description
 The transaction type table 152 holds the numeric identifier and name of the transaction type. For example 'Submit Transaction' 'Offer Accept'.

TRANSACTIONTYPEID

Description
 Numerical identification of the transaction type.

NAME

Description
 Unique name of the transaction type. For example 'Submit Transaction', 'Offer Accept', 'Rescore'.

LASTUPDATEDTIME

Description
 Timestamp of last update.

LASTUPDATEDUSER

Description
 User Id of last update.

USERROLE TABLE

Description
The user role table 154 holds the numeric identifier and name of a user role.

USERROLEID

Description
Numerical identification of a user role.

NAME

Description
Unique name of the user type. For example 'API User', 'Administrator', 'CALMS User'.

LASTUPDATEDTIME

Description
Timestamp of last update.

LASTUPDATEDUSER

Description
User Id of last update.

USERTYPE TABLE

Description
The user type table 156 holds the numeric identifier and name of the user type. For example 'Broker', 'Creditor'.

USERTYPEID

Description
Numerical identification of the user type.

NAME

Description
Unique name of the user type.

LASTUPDATEDTIME

Description
Timestamp of last update.

LASTUPDATEDUSER

Description
User Id of last update.

Rules

| Acceptance must be described by a Product Match | |
|---|---|
| Name: | Acceptance must be described by a Product Match |
| Code: | PRODMATCH_ACCEPTANCE |
| Label: | |
| Parent: | PRODUCTMATCH |
| Child: | ACCEPTANCE |
| Cardinality: | 0, 1 |
| Join: | PRODUCTMATCH ACCEPTANCE APPLICATIONSUBMISSIONID = APPLICATIONSUBMISSIONID PRODUCTMATCHID = PRODUCTMATCHID PRODUCTMATCH = ACCEPTANCE |
| Modification rule for parent Table: | Restrict |
| Deletion rule for parent Table: | Restrict |
| Parent mandatory for the child Table: | Yes |
| Change parent allowed for the child Table: | Yes |

| Application Submission may reference a Broker | |
|---|---|
| Name: | Application Submission may reference a Broker |
| Code: | BRKR_APPLSUB |
| Label: | |
| Parent: | BROKER |
| Child: | APPLICATIONSUBMISSION |
| Cardinality: | 0, n |
| Join: | BROKER APPLICATIONSUBMISSION BROKERID = BROKERID BROKER = APPLICATIONSUBMISSION |
| Modification rule for parent Table: | Restrict |
| Deletion rule for parent Table: | Restrict |
| Parent mandatory for the child Table: | No |
| Change parent allowed for the child Table: | Yes |

| Application Submission may reference a Creditor | |
|---|---|
| Name: | Application Submission may reference a Creditor |
| Code: | CRED_APPLSUB |
| Label: | |
| Parent: | CREDITOR |
| Child: | APPLICATIONSUBMISSION |
| Cardinality: | 0, n |
| Join: | CREDITOR APPLICATIONSUBMISSION CREDITORID = CREDITORID CREDITOR = APPLICATIONSUBMISSION |
| Modification rule for parent Table: | Restrict |
| Deletion rule for parent Table: | Restrict |
| Parent mandatory for the child Table: | No |
| Change parent allowed for the child Table: | Yes |

| Application Submission must reference a system Offering | |
|---|---|
| Name: | Application Submission must reference a system Offering |
| Code: | LQDCREDITOFFR_APPLCATIONSUB |
| Label: | |
| Parent: | LIQUIDCREDITOFFERING |
| Child: | APPLICATIONSUBMISSION |
| Cardinality: | 0, n |
| Join: | LIQUIDCREDITOFFERING APPLICATIONSUBMISSION LIQUIDCREDITOFFERINGID = LIQUIDCREDITOFFERINGID LIQUIDCREDITOFFERING = APPLICATIONSUBMISSION |
| Modification rule for parent Table: | Restrict |
| Deletion rule for parent Table: | Restrict |
| Parent mandatory for the child Table: | Yes |
| Change parent allowed for the child Table: | Yes |

| Audit may reference a System User | |
| --- | --- |
| Name: | Audit may reference a System User |
| Code: | SYSUSER_AUDITTBL |
| Label: | |
| Parent: | SYSTEMUSER |
| Child: | AUDITTABLE |
| Cardinality: | 0, n |
| Join: | SYSTEMUSER AUDITTABLE SYSTEMUSERID = SYSTEMUSERID SYSTEMUSER = AUDITTABLE |
| Modification rule for parent Table: | Restrict |
| Deletion rule for parent Table: | Restrict |
| Parent mandatory for the child Table: | No |
| Change parent allowed for the child Table: | Yes |

| Audit Table tracks Broker Changes | |
| --- | --- |
| Name: | Audit Table tracks Broker Changes |
| Code: | BRKR_AUDITTBL |
| Label: | |
| Parent: | BROKER |
| Child: | AUDITTABLE |
| Cardinality: | 0, n |
| Join: | BROKER AUDITTABLE BROKERID = BROKERID BROKER = AUDITTABLE |
| Modification rule for parent Table: | Restrict |
| Deletion rule for parent Table: | Restrict |
| Parent mandatory for the child Table: | No |
| Change parent allowed for the child Table: | Yes |

| Audit Table tracks Creditor Changes | |
| --- | --- |
| Name: | Audit Table tracks Creditor Changes |
| Code: | CRED_AUDITTBL |
| Label: | |
| Parent: | CREDITOR |
| Child: | AUDITTABLE |
| Cardinality: | 0, n |
| Join: | CREDITOR AUDITTABLE CREDITORID = CREDITORID CREDITOR = AUDITTABLE |
| Modification rule for parent Table: | Restrict |
| Deletion rule for parent Table: | Restrict |
| Parent mandatory for the child Table: | No |
| Change parent allowed for the child Table: | Yes |

| Audit Table must reference an Audit Type | |
| --- | --- |
| Name: | Audit Table must reference an Audit Type |
| Code: | AUDITTYPE_AUDITTBL |
| Label: | |
| Parent: | AUDITTYPE |
| Child: | AUDITTABLE |
| Cardinality: | 0, n |
| Join: | AUDITTYPE AUDITTABLE AUDITTYPEID = AUDITTYPEID AUDITTYPE = AUDITTABLE |

-continued

| Audit Table must reference an Audit Type | |
| --- | --- |
| Modification rule for parent Table: | Restrict |
| Deletion rule for parent Table: | Restrict |
| Parent mandatory for the child Table: | Yes |
| Change parent allowed for the child Table: | Yes |

| Broker has agreement with Creditor through Brokerage Agreement table | |
| --- | --- |
| Name: | Broker has agreement with Creditor through Brokerage Agreement table |
| Code: | BRKR_BRKRAGEAGREE |
| Label: | |
| Parent: | BROKER |
| Child: | BROKERAGEAGREEMENT |
| Cardinality: | 0, n |
| Join: | BROKER BROKERAGEAGREEMENT BROKERID = BROKERID BROKER = BROKERAGEAGREEMENT |
| Modification rule for parent Table: | Restrict |
| Deletion rule for parent Table: | Restrict |
| Parent mandatory for the child Table: | Yes |
| Change parent allowed for the child Table: | Yes |

| Broker is associated with a Product Match through Acceptance | |
| --- | --- |
| Name: | Broker is associated with a Product Match through Acceptance |
| Code: | BRKR_ACCPTANCE |
| Label: | |
| Parent: | BROKER |
| Child: | ACCEPTANCE |
| Cardinality: | 0, n |
| Join: | BROKER ACCEPTANCE BROKERID = BROKERID BROKER = ACCEPTANCE |
| Modification rule for parent Table: | Restrict |
| Deletion rule for parent Table: | Restrict |
| Parent mandatory for the child Table: | Yes |
| Change parent allowed for the child Table: | Yes |

| Broker is associated with a Score Card through the Broker Score Card Agreement | |
| --- | --- |
| Name: | Broker is associated with a Score Card through the Broker Score Card Agreement |
| Code: | BRKR_BRKRSCRCARDASSIGN |
| Label: | |
| Parent: | BROKER |
| Child: | BROKERSCORECARDASSIGNMENT |
| Cardinality: | 0, n |
| Join: | BROKER BROKERSCORECARDASSIGNMENT BROKERID = BROKERID BROKER = BROKERSCORECARDASSIGNMENT |

Broker is associated with a Score Card through the Broker Score Card Agreement

| | |
|---|---|
| Modification rule for parent Table: | Restrict |
| Deletion rule for parent Table: | Restrict |
| Parent mandatory for the child Table: | Yes |
| Change parent allowed for the child Table: | Yes |

Broker must reference a Customer

| | |
|---|---|
| Name: | Broker must reference a Customer |
| Code: | CUST_BRKR |
| Label: | |
| Parent: | CUSTOMER |
| Child: | BROKER |
| Cardinality: | 0, n |
| Join: | CUSTOMER BROKER<br>CUSTOMERID = CUSTOMERID<br>CUSTOMER = BROKER |
| Modification rule for parent Table: | Restrict |
| Deletion rule for parent Table: | Restrict |
| Parent mandatory for the child Table: | Yes |
| Change parent allowed for the child Table: | Yes |

Broker Score Card Assignment must reference a Score Card

| | |
|---|---|
| Name: | Broker Score Card Assignment must reference a Score Card |
| Code: | SCRCARD_BRKRSCRCARDASSGN |
| Label: | |
| Parent: | SCORECARD |
| Child: | BROKERSCORECARDASSIGNMENT |
| Cardinality: | 0, n |
| Join: | SCORECARD BROKERSCORECARDASSIGNMENT<br>SCORECARDID = SCORECARDID<br>SCORECARD = BROKERSCORECARDASSIGNMENT |
| Modification rule for parent Table: | Restrict |
| Deletion rule for parent Table: | Restrict |
| Parent mandatory for the child Table: | Yes |
| Change parent allowed for the child Table: | Yes |

Broker User must be described by a Broker

| | |
|---|---|
| Name: | Broker User must be described by a Broker |
| Code: | BROKER_BRKRUSER |
| Label: | |
| Parent: | BROKER |
| Child: | BROKERUSER |
| Cardinality: | 0, n |
| Join: | BROKER BROKERUSER<br>BROKERID = BROKERID<br>BROKER = BROKERUSER |
| Modification rule for parent Table: | Restrict |
| Deletion rule for parent Table: | Restrict |
| Parent mandatory for the child Table: | Yes |
| Change parent allowed for the child Table: | Yes |

Broker User must be described by a System User

| | |
|---|---|
| Name: | Broker User must be described by a System User |
| Code: | SYSUSER_BRKRUSER |
| Label: | |
| Parent: | SYSTEMUSER |
| Child: | BROKERUSER |
| Cardinality: | 0, n |
| Join: | SYSTEMUSER BROKERUSER<br>SYSTEMUSERID = SYSTEMUSERID<br>SYSTEMUSER = BROKERUSER |
| Modification rule for parent Table: | Restrict |
| Deletion rule for parent Table: | Restrict |
| Parent mandatory for the child Table: | Yes |
| Change parent allowed for the child Table: | Yes |

Characteristic must reference Data Type

| | |
|---|---|
| Name: | Characteristic must reference Data Type |
| Code: | DATATYPE_CHAR |
| Label: | |
| Parent: | DATATYPE |
| Child: | CHARACTERISTIC |
| Cardinality: | 0, n |
| Join: | DATATYPE CHARACTERISTIC<br>DATATYPEID = DATATYPEID<br>DATATYPE = CHARACTERISTIC |
| Modification rule for parent Table: | Restrict |
| Deletion rule for parent Table: | Restrict |
| Parent mandatory for the child Table: | Yes |
| Change parent allowed for the child Table: | Yes |

Characteristic must reference Market Segment

| | |
|---|---|
| Name: | Characteristic must reference Market Segment |
| Code: | MRKTSEG_CHAR |
| Label: | |
| Parent: | MARKETSEGMENT |
| Child: | CHARACTERISTIC |
| Cardinality: | 0, n |
| Join: | MARKETSEGMENT CHARACTERISTIC<br>MARKETSEGMENTID = MARKETSEGMENTID<br>MARKETSEGMENT = CHARACTERISTIC |
| Modification rule for parent Table: | Restrict |
| Deletion rule for parent Table: | Restrict |
| Parent mandatory for the child Table: | Yes |
| Change parent allowed for the child Table: | Yes |

| Characteristic must reference Range Comparison | |
|---|---|
| Name: | Characteristic must reference Range Comparison |
| Code: | RANGECOMP_CHAR |
| Label: | |
| Parent: | RANGECOMPARISON |
| Child: | CHARACTERISTIC |
| Cardinality: | 0, n |
| Join: | RANGECOMPARISON CHARACTERISTIC RANGECOMPARISONID = RANGECOMPARISONID |
| Modification rule for parent Table: | Restrict |
| Deletion rule for parent Table: | Restrict |
| Parent mandatory for the child Table: | Yes |
| Change parent allowed for the child Table: | Yes |

| Creditor has agreements with Broker through Brokerage Agreement table | |
|---|---|
| Name: | Creditor has agreements with Broker through Brokerage Agreement table |
| Code: | CRED_BRKRAGEAGREE |
| Label: | |
| Parent: | CREDITOR |
| Child: | BROKERAGEAGREEMENT |
| Cardinality: | 0, n |
| Join: | CREDITOR BROKERAGEAGREEMENT CREDITORID = CREDITORID CREDITOR = BROKERAGEAGREEMENT |
| Modification rule for parent Table: | Restrict |
| Deletion rule for parent Table: | Restrict |
| Parent mandatory for the child Table: | Yes |
| Change parent allowed for the child Table: | Yes |

| Creditor is associated with a Score Card through Creditor Score Card Agreement | |
|---|---|
| Name: | Creditor is associated with a Score Card through Creditor Score Card Agreement |
| Code: | CRED_CREDSCRASSGN |
| Label: | |
| Parent: | CREDITOR |
| Child: | CREDITORSCORECARDASSIGNMENT |
| Cardinality: | 0, n |
| Join: | CREDITOR CREDITORSCORECARDASSIGNMENT CREDITORID = CREDITORID CREDITOR = CREDITORSCORECARDASSIGNMENT |
| Modification rule for parent Table: | Restrict |
| Deletion rule for parent Table: | Restrict |
| Parent mandatory for the child Table: | Yes |
| Change parent allowed for the child Table: | Yes |

| Creditor must reference a Customer | |
|---|---|
| Name: | Creditor must reference a Customer |
| Code: | CUST_CRED |
| Label: | |
| Parent: | CUSTOMER |
| Child: | CREDITOR |
| Cardinality: | 0, n |
| Join: | CUSTOMER CREDITOR CUSTOMERID = CUSTOMERID CUSTOMER = CREDITOR |
| Modification rule for parent Table: | Restrict |
| Deletion rule for parent Table: | Restrict |
| Parent mandatory for the child Table: | Yes |
| Change parent allowed for the child Table: | Yes |

| Creditor Score Card Assignment must reference a Score Card | |
|---|---|
| Name: | Creditor Score Card Assignment must reference a Score Card |
| Code: | SCRCARD_CREDSCRASSGN |
| Label: | |
| Parent: | SCORECARD |
| Child: | CREDITORSCORECARDASSIGNMENT |
| Cardinality: | 0, n |
| Join: | SCORECARD CREDITORSCORECARDASSIGNMENT SCORECARDID = SCORECARDID SCORECARD = CREDITORSCORECARDASSIGNMENT |
| Modification rule for parent Table: | Restrict |
| Deletion rule for parent Table: | Restrict |
| Parent mandatory for the child Table: | Yes |
| Change parent allowed for the child Table: | Yes |

| Creditor User must be described by a Creditor | |
|---|---|
| Name: | Creditor User must be described by a Creditor |
| Code: | CRED_CREDUSER |
| Label: | |
| Parent: | CREDITOR |
| Child: | CREDITORUSER |

-continued

Creditor User must be described by a Creditor

| | |
|---|---|
| Cardinality: | 0, n |
| Join: | CREDITOR CREDITORUSER |
| | CREDITORID = CREDITORID |
| | CREDITOR = CREDITORUSER |
| Modification rule for parent Table: | Restrict |
| Deletion rule for parent Table: | Restrict |
| Parent mandatory for the child Table: | Yes |
| Change parent allowed for the child Table: | Yes |

Creditor User must be described by a System User

| | |
|---|---|
| Name: | Creditor User must be described by a System User |
| Code: | SYSUSER_CREDUSER |
| Label: | |
| Parent: | SYSTEMUSER |
| Child: | CREDITORUSER |
| Cardinality: | 0, n |
| Join: | SYSTEMUSER CREDITORUSER |
| | SYSTEMUSERID = SYSTEMUSERID |
| | SYSTEMUSER = CREDITORUSER |
| Modification rule for parent Table: | Restrict |
| Deletion rule for parent Table: | Restrict |
| Parent mandatory for the child Table: | Yes |
| Change parent allowed for the child Table: | Yes |

Customer Contact must be described by a Customer

| | |
|---|---|
| Name: | Customer Contact must be described by a Customer |
| Code: | CUST_CUSTCONTACT |
| Label: | |
| Parent: | CUSTOMER |
| Child: | CUSTOMERCONTACT |
| Cardinality: | 0, n |
| Join: | CUSTOMER CUSTOMERCONTACT |
| | CUSTOMERID = CUSTOMERID |
| | CUSTOMER = CUSTOMERCONTACT |
| Modification rule for parent Table: | Restrict |
| Deletion rule for parent Table: | Restrict |
| Parent mandatory for the child Table: | Yes |
| Change parent allowed for the child Table: | Yes |

Customer Contact table must reference a Contact Type

| | |
|---|---|
| Name: | Customer Contact table must reference a Contact Type |
| Code: | CONACTTYP_CUSTCONTACT |
| Label: | |
| Parent: | CONTACTTYPE |
| Child: | CUSTOMERCONTACT |
| Cardinality: | 0, n |
| Join: | CONTACTTYPE CUSTOMERCONTACT |
| | CONTACTTYPEID = CONTACTTYPEID |
| | CONTACTTYPE = CUSTOMERCONTACT |

Customer Contact table must reference a Contact Type

| | |
|---|---|
| Modification rule for parent Table: | Restrict |
| Deletion rule for parent Table: | Restrict |
| Parent mandatory for the child Table: | Yes |
| Change parent allowed for the child Table: | Yes |

Product Category must reference a Market Segment

| | |
|---|---|
| Name: | Product Category must reference a Market Segment |
| Code: | MRKTSEG_PRODCAT |
| Label: | |
| Parent: | MARKETSEGMENT |
| Child: | PRODUCTCATEGORY |
| Cardinality: | 0, n |
| Join: | MARKETSEGMENT PRODUCTCATEGORY |
| | MARKETSEGMENTID = MARKETSEGMENTID |
| | MARKETSEGMENT = PRODUCTCATEGORY |
| Modification rule for parent Table: | Restrict |
| Deletion rule for parent Table: | Restrict |
| Parent mandatory for the child Table: | Yes |
| Change parent allowed for the child Table: | Yes |

Product Characteristic must reference Characteristic

| | |
|---|---|
| Name: | Product Characteristic must reference Characteristic |
| Code: | CHAR_PRODCHAR |
| Label: | |
| Parent: | CHARACTERISTIC |
| Child: | PRODUCTCHARACTERISTIC |
| Cardinality: | 0, n |
| Join: | CHARACTERISTIC PRODUCTCHARACTERISTIC |
| | CHARACTERISTICID = CHARACTERISTICID |
| | CHARACTERISTIC = PRODUCTCHARACTERISTIC |
| | CHARACTERISTIC = PRODUCTCHARACTERISTIC |
| Modification rule for parent Table: | Restrict |
| Deletion rule for parent Table: | Restrict |
| Parent mandatory for the child Table: | Yes |
| Change parent allowed for the child Table: | Yes |

Product Characteristic must reference Decision Party

| | |
|---|---|
| Name: | Product Characteristic must reference Decision Party |
| Code: | DECISIONPARTY_PRODCHAR |
| Label: | |
| Parent: | DECISIONPARTY |

Product Characteristic must reference Decision Party

| | |
|---|---|
| Child: | PRODUCTCHARACTERISTIC |
| Cardinality: | 0, n |
| Join: | DECISIONPARTY PRODUCTCHARACTERISTIC DECISIONPARTYID = DECISIONPARTYID DECISIONPARTY = PRODUCTCHARACTERISTIC |
| Modification rule for parent Table: | Restrict |
| Deletion rule for parent Table: | Restrict |
| Parent mandatory for the child Table: | Yes |
| Change parent allowed for the child Table: | Yes |

Product Characteristic must reference Product

| | |
|---|---|
| Name: | Product Characteristic must reference Product |
| Code: | PROD_PRODCHAR |
| Label: | |
| Parent: | PRODUCT |
| Child: | PRODUCTCHARACTERISTIC |
| Cardinality: | 0, n |
| Join: | PRODUCT PRODUCTCHARACTERISTIC CREDITORID = CREDITORID PRODUCTID = PRODUCTID |
| Modification rule for parent Table: | Restrict |
| Deletion rule for parent Table: | Restrict |
| Parent mandatory for the child Table: | Yes |
| Change parent allowed for the child Table: | Yes |

Product Match must be described by an Application Submission

| | |
|---|---|
| Name: | Product Match must be described by an Application Submission |
| Code: | APPLSUB_PRODMATCH |
| Label: | |
| Parent: | APPLICATIONSUBMISSION |
| Child: | PRODUCTMATCH |
| Cardinality: | 0, n |
| Join: | APPLICATIONSUBMISSION PRODUCTMATCH APPLICATIONSUBMISSIONID = APPLICATIONSUBMISSIONID APPLICATIONSUBMISSION = PRODUCTMATCH |
| Modification rule for parent Table: | Restrict |
| Deletion rule for parent Table: | Restrict |
| Parent mandatory for the child Table: | Yes |
| Change parent allowed for the child Table: | Yes |

Product Match must reference a Product

| | |
|---|---|
| Name: | Product Match must reference a Product |
| Code: | PROD_PRODMATCH |
| Label: | |
| Parent: | PRODUCT |
| Child: | PRODUCTMATCH |
| Cardinality: | 0, n |
| Join: | PRODUCT PRODUCTMATCH CREDITORID = CREDITORID PRODUCTID = PRODUCTID PRODUCT = PRODUCTMATCH |
| Modification rule for parent Table: | Restrict |
| Deletion rule for parent Table: | Restrict |
| Parent mandatory for the child Table: | Yes |
| Change parent allowed for the child Table: | Yes |

Product Match must reference System User

| | |
|---|---|
| Name: | Product Match must reference System User |
| Code: | SYSTEMUSER_PRODMATCH |
| Label: | |
| Parent: | SYSTEMUSER |
| Child: | PRODUCTMATCH |
| Cardinality: | 0, n |
| Join: | SYSTEMUSER PRODUCTMATCH SYSTEMUSERID = SYSTEMUSERID SYSTEMUSER = PRODUCTMATCH |
| Modification rule for parent Table: | Restrict |
| Deletion rule for parent Table: | Restrict |
| Parent mandatory for the child Table: | Yes |
| Change parent allowed for the child Table: | Yes |

Product must reference a Product Category

| | |
|---|---|
| Name: | Product must reference a Product Category |
| Code: | PRODCAT_PROD |
| Label: | |
| Parent: | PRODUCTCATEGORY |
| Child: | PRODUCT |
| Cardinality: | 0, n |
| Join: | PRODUCTCATEGORY PRODUCT MARKETSEGMENTID = MARKETSEGMENTID PRODUCTCATEGORYID = PRODUCTCATEGORYID PRODUCTCATEGORY = PRODUCT |
| Modification rule for parent Table: | Restrict |
| Deletion rule for parent Table: | Restrict |
| Parent mandatory for the child Table: | Yes |
| Change parent allowed for the child Table: | Yes |

Products must be described by a Creditor

| | |
|---|---|
| Name: | Products must be described by a Creditor |

-continued
Products must be described by a Creditor

| | |
|---|---|
| Code: | CRED_PROD |
| Label: | |
| Parent: | CREDITOR |
| Child: | PRODUCT |
| Cardinality: | 0, n |
| Join: | CREDITOR PRODUCT<br>CREDITORID = CREDITORID<br>CREDITOR = PRODUCT |
| Modification rule for parent Table: | Restrict |
| Deletion rule for parent Table: | Restrict |
| Parent mandatory for the child Table: | Yes |
| Change parent allowed for the child Table: | Yes |

System Global Variable must reference Data Type

| | |
|---|---|
| Name: | System Global Variable must reference Data Type |
| Code: | DATATYPE_SYSGLBVAR |
| Label: | |
| Parent: | DATATYPE |
| Child: | SYSTEMGLOBALVARIABLE |
| Cardinality: | 0, n |
| Join: | DATATYPE SYSTEMGLOBALVARIABLE<br>DATATYPEID = DATATYPEID<br>DATATYPE = SYSTEMGLOBALVARIABLE |
| Modification rule for parent Table: | Restrict |
| Deletion rule for parent Table: | Restrict |
| Parent mandatory for the child Table: | Yes |
| Change parent allowed for the child Table: | Yes |

System User must reference a system Offering

| | |
|---|---|
| Name: | System User must reference a system Offering |
| Code: | LQDCREDITOFFR_SYSUSER |
| Label: | |
| Parent: | LIQUIDCREDITOFFERING |
| Child: | SYSTEMUSER |
| Cardinality: | 0, n |
| Join: | LIQUIDCREDITOFFERING SYSTEMUSER<br>LIQUIDCREDITOFFERINGID = LIQUIDCREDITOFFERINGID<br>LIQUIDCREDITOFFERING = SYSTEMUSER |
| Modification rule for parent Table: | Restrict |
| Deletion rule for parent Table: | Restrict |
| Parent mandatory for the child Table: | Yes |
| Change parent allowed for the child Table: | Yes |

System User must reference a User Role

| | |
|---|---|
| Name: | System User must reference a User Role |
| Code: | USERROLE_SYSUSER |
| Label: | |
| Parent: | USERROLE |
| Child: | SYSTEMUSER |
| Cardinality: | 0, n |
| Join: | USERROLE SYSTEMUSER<br>USERROLEID = USERROLEID<br>USERROLE = SYSTEMUSER |
| Modification rule for parent Table: | Restrict |
| Deletion rule for parent Table: | Restrict |
| Parent mandatory for the child Table: | Yes |
| Change parent allowed for the child Table: | Yes |

System User must reference a User Type

| | |
|---|---|
| Name: | System User must reference a User Type |
| Code: | USERTYP_SYSUSER |
| Label: | |
| Parent: | USERTYPE |
| Child: | SYSTEMUSER |
| Cardinality: | 0, n |
| Join: | USERTYPE SYSTEMUSER<br>USERTYPEID = USERTYPEID<br>USERTYPE = SYSTEMUSER |
| Modification rule for parent Table: | Restrict |
| Deletion rule for parent Table: | Restrict |
| Parent mandatory for the child Table: | Yes |
| Change parent allowed for the child Table: | Yes |

Transaction Event must reference a Transaction Type

| | |
|---|---|
| Name: | Transaction Event must reference a Transaction Type |
| Code: | TRANSTYP_TRANS |
| Label: | |
| Parent: | TRANSACTIONTYPE |
| Child: | TRANSACTIONEVENT |
| Cardinality: | 0, n |
| Join: | TRANSACTIONTYPE TRANSACTIONEVENT<br>TRANSACTIONTYPEID = TRANSACTIONTYPEID<br>TRANSACTIONTYPE = TRANSACTIONEVENT |
| Modification rule for parent Table: | Restrict |
| Deletion rule for parent Table: | Restrict |
| Parent mandatory for the child Table: | Yes |
| Change parent allowed for the child Table: | Yes |

Transaction Event must reference an Application Submission

| | |
|---|---|
| Name: | Transaction Event must reference an Application Submission |
| Code: | APPLSUB_TRANS |
| Label: | |
| Parent: | APPLICATIONSUBMISSION |
| Child: | TRANSACTIONEVENT |
| Cardinality: | 0, n |
| Join: | APPLICATIONSUBMISSION TRANSACTIONEVENT<br>APPLICATIONSUBMISSIONID = |

-continued

| Transaction Event must reference an Application Submission | |
|---|---|
| | APPLICATIONSUBMISSIONID APPLICATIONSUBMISSION = TRANSACTIONEVENT |
| Modification rule for parent Table: | Restrict |
| Deletion rule for parent Table: | Restrict |
| Parent mandatory for the child Table: | Yes |
| Change parent allowed for the child Table: | Yes |

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for implementation by one or more computing systems, each computing system comprising at least one data processor, the method comprising:

installing, at a lending institution, security certificates for access to one or more financial service components residing on a single application service provider platform (ASP) of a company using company's application programming interface (API) guidelines;

receiving, by one or more computing systems of the lending institution, data comprising a credit application;

posting, by the one or more computing systems of the lending institution, the credit application to one or more financial services components of a company the one or more financial service components each comprising at least one computing system, the lending institution setting up one or more financial product entries for access by the one or more financial services components;

accessing and manipulating, by the one or more of the financial services components of the company, credit bureau data in connection with said credit application;

accessing, by one or more of the financial services components of the company, credit scoring in connection with said credit application;

accessing, by one or more of the financial services components of the company, credit decisioning in connection with said credit application;

determining, by one or more of the computing systems, on behalf of the lending institution if credit is to be granted, refused, or if further review is necessary based on the data characterizing the credit application, the credit scoring, and the decisioning; and if credit is to be granted, automatically selecting, by one or more of the financial services components of the company, at least one credit product on behalf of a lending institution from a plurality of credit products, said at least one credit product being a best fit to said credit application that results from said accessing steps;

wherein said accessing steps are provided via the ASP and are accessible through a standard API.

2. A method as in claim 1, wherein the one or more financial services components are coupled to one or more credit bureaus and one or more business bureaus.

3. A credit application apparatus, comprising:

means for installing, at a lending institution, security certificates for access to one or more financial service components residing on a single application service provider platform (ASP) of a company using company's application programming interface (API) guidelines;

means associated with the lending institution for receiving a credit application and for posting data characterizing the credit application to one or more financial services components, the one or more financial service components each comprising at least one computing system, the lending institution setting up one or more financial product entries for access by the one or more financial services components;

means associated with one or more financial services components for accessing and manipulating credit bureau data in connection with said credit application;

means associated with one or more financial services components for accessing credit scoring in connection with said credit application;

means for accessing credit decisioning in connection with said credit application and determining if credit is to be granted, refused, or if further review is necessary based on the credit scoring; and means associated with one or more financial services components for selecting at least one credit product from a plurality of credit products on behalf of a lending institution if credit is to be granted, said at least one credit product being a best fit to said credit application that results from said accessing modules;

wherein said means for accessing are provided in a single ASP computing platform and are accessible through a standard API.

4. The apparatus of claim 3, wherein one or more of the means for receiving a credit application, means for accessing and manipulating credit bureau data, means for accessing credit scoring, means for accessing credit decisioning, and means for selecting at least one credit product comprise any of an app engine, a broker engine, and a decision engine, each of such engines being implemented in computer hardware.

5. The apparatus of claim 4, wherein said app engine comprises:

a graphical user interface (GUI) for collecting data that are necessary for submitting a request for any of a loan, credit card, lease, or line of credit or a securitization (resale) of the same a GUI for reviewing and manually decisioning an application for those applications not being automatically approved or declined;

a GUI to configure the decisioning rules, score cut offs, automatic review rules, and loan/lease characteristics;

wherein on submission of an application, certain application data are sent to said decision engine.

6. The apparatus of claim 4, wherein said decision engine pulls a credit reporting agency report, scores said credit application, and performs a product match.

7. The apparatus of claim 6, wherein said product match identifies all credit products for which a credit applicant is qualified, for each financial institution working with a broker.

8. The apparatus of claim 7, wherein application data, which may comprise any of credit reporting agency data, score, reason codes, and product matches, are sent back to said GUI to be presented for further processing.

9. The apparatus of claim 8, wherein a loan is automatically recommended for approval, review, or disapproval;

wherein, if approved, said credit application, decisioning, and credit bureau data are provided to a secure server for a lending institution to obtain and use;

wherein, if review is needed, said credit application is routed to an appropriate group for further work and decisioning; and wherein, if said credit application is disapproved, reasons for said disapproval and all of said credit application, decisioning, and credit bureau data are provided to a secure server for said lending institution to obtain and use.

10. The apparatus of claim 3, further comprising:
a data-base of all of said credit application, decisioning, and credit bureau data, wherein said data are maintained for an appropriate interval.

11. The apparatus of claim 4, wherein said broker engine pulls a credit reporting agency report, scores said credit application, and performs a product match.

12. The apparatus of claim 11, wherein said product match identifies all credit products for which an applicant is qualified, for each financial institution working with a broker.

13. The apparatus of claim 4, wherein said decision engine pulls a credit reporting agency report, scores said credit application, and performs a product match.

14. The apparatus of claim 13, wherein said product match identifies all credit products for which an applicant is qualified, for each financial institution working with a broker.

15. The apparatus of claim 4, further comprising an application program interface (API) that comprises a number of function calls which provide the ability to interact with said modules.

16. The apparatus of claim 15, wherein said API is accessed using SOAP (Simple Object Access Protocol);
wherein data are submitted using XML (Extensible Markup Language); and wherein all calls to said API are synchronous.

17. The apparatus of claim 4, wherein any of said decision and/or said broker engine:
receives a call from an application processing system to make a decision on an application;
uses data in said credit application and pre-programmed bureau preferences of clients; and
obtains a credit bureau report on an applicant and a co-applicant (if co-applicant information is submitted);
wherein said broker engine automatically routes said credit application and credit bureau data to said decisioning engine to obtain a combined score.

18. The apparatus of claim 17, wherein said broker engine uses said score and other factors established by a financial services institution to determine any products for which said credit application qualifies; and
wherein said broker engine returns said product matches to said calling application processing system with all decisioning data and reason codes.

19. The apparatus of claim 18, wherein said matches can be from any of similar products, dissimilar products, or no products might be recommended.

20. The apparatus of claim 18, wherein reason codes are returned in said data if no products can be recommended.

21. The apparatus of claim 18, wherein after said products are returned, said application processing system allows said applicant to choose a best product for them;
wherein said calling system then creates a second call to said broker engine to tell it what product was selected; and
wherein said broker engine, in turn, sends this selection to an appropriate financial services institution with complete decisioning information.

22. A system comprising:
means for installing, at a lending institution, security certificates for access to one or more financial service components residing on a single application service provider platform (ASP) of a company using company's application programming interface (API) guidelines;
means for receiving data comprising a credit application;
means for posting the credit application to one or more financial services components of a company the one or more financial service components each comprising at least one computing system, the lending institution setting up one or more financial product entries for access by the one or more financial services components;
means for accessing and manipulating credit bureau data in connection with said credit application;
means for accessing credit scoring in connection with said credit application;
means for accessing credit decisioning in connection with said credit application;
means for determining on behalf of the lending institution if credit is to be granted, refused, or if further review is necessary based on the data characterizing the credit application, the credit scoring, and the decisioning; and
means for automatically selecting, if credit is to be granted, at least one credit product on behalf of a lending institution from a plurality of credit products, said at least one credit product being a best fit to said credit application that results from said accessing steps;
wherein said means for accessing are provided via the ASP and are accessible through a standard API.

* * * * *